United States Patent [19]

Kawashima et al.

[11] Patent Number: 5,501,292
[45] Date of Patent: Mar. 26, 1996

[54] ELECTRICALLY OPERATED VEHICLE

[75] Inventors: Yoshinori Kawashima, Saitama; Atsuo Hojo; Masayoshi Ryu, both of Tokyo, all of Japan

[73] Assignee: Honda Giken Kogyo Kabushiki Kaisha, Tokyo, Japan

[21] Appl. No.: 180,768

[22] Filed: Jan. 10, 1994

Related U.S. Application Data

[63] Continuation of Ser. No. 739,839, Aug. 2, 1991, abandoned.

[30] Foreign Application Priority Data

| Aug. 2, 1990 | [JP] | Japan | 2-205593 |
| Oct. 11, 1990 | [JP] | Japan | 2-272940 |
| Oct. 11, 1990 | [JP] | Japan | 2-272941 |
| Mar. 3, 1991 | [JP] | Japan | 3-043877 |

[51] Int. Cl.⁶ .................................... B62K 11/00
[52] U.S. Cl. .................. 180/220; 180/229; 180/65.1
[58] Field of Search ......................... 180/219, 220, 180/229, 230, 68.1, 68.5, 205, 207, 65.6, 65.1, 277; 165/44

[56] References Cited

U.S. PATENT DOCUMENTS

| 547,441 | 10/1895 | Libbey | 180/220 |
| 3,554,311 | 1/1971 | Thompson | 180/220 |
| 3,937,291 | 2/1976 | Hanagan | 180/220 |
| 4,135,593 | 1/1979 | Fowkes | 180/65.1 |
| 4,331,209 | 5/1982 | Bauer et al. | 180/65.1 |
| 4,363,375 | 12/1982 | Kamiya | 180/227 |
| 4,418,777 | 12/1983 | Stockton | 180/65.6 |
| 4,519,473 | 5/1985 | Ochiai et al. | 180/229 |
| 4,618,019 | 10/1986 | Ando et al. | 180/219 |
| 4,618,020 | 10/1986 | Noda | 180/229 |
| 4,621,680 | 11/1986 | Funabashi | 180/229 |
| 5,101,924 | 4/1992 | Yamagiwa et al. | 180/220 |
| 5,111,090 | 5/1992 | Otake et al. | 180/229 |

FOREIGN PATENT DOCUMENTS

| 0444975 | 9/1991 | European Pat. Off. | 180/65.1 |
| 582287 | 12/1924 | France . | |
| 1048048 | 12/1953 | France . | |
| 2180709 | 11/1973 | France . | |
| 51-80848 | 6/1976 | Japan . | |
| 4-10151 | 1/1992 | Japan . | |

*Primary Examiner*—Anne Marie Boehler
*Attorney, Agent, or Firm*—Birch, Stewart, Kolasch & Birch

[57] ABSTRACT

An electrically operated saddle type vehicle includes a vehicle frame having at least one front wheel supported on a front wheel supporting member mounted adjacent to a front portion of the vehicle frame and at least one rear wheel supported on a rear wheel supporting member mounted adjacent to a rear portion of the vehicle frame. An electric motor is supported on the vehicle frame between the front wheel and the rear wheel and includes a front portion positioned adjacent to the front wheel. A transmission member is operatively connected to the electric motor and at least one of the front and rear wheels for providing propulsion for the vehicle. Wherein air is directed to contact the electric motor while the vehicle is in motion for cooling the electric motor during use.

26 Claims, 21 Drawing Sheets

ELECTRICALLY OPERATED VEHICLE

This application is a continuation of application Ser. No. 07/739,839 filed Aug. 2, 1991, now abandoned.

BACKGROUND OF THE INVENTION

1. Field of the Invention

This invention relates to a two-wheeled or three-wheeled electrically operated saddle type vehicle. More particularly, to a driving apparatus for an electrically operated saddle type vehicle and to the suspension of an electric motor on a body frame such that it is opposed to a front wheel so that air may be introduced to the electric motor to cool the electric motor.

2. Description of Background Art

An electrically operated saddle type vehicle carries an electric motor and a battery thereon and is driven by supplying power from the battery to the electric motor. In such electrically operated saddle type vehicle, the electric motor and battery both have a certain weight. In addition, the battery has a large volume. Thus, mounting the electric motor and the battery on a body frame is subject to positional restriction.

Conventionally, an electrically operated saddle type vehicle is known wherein a hanger member is suspended on a body frame and a battery is placed at a front portion of the hanger member. An electric motor is placed at a rear portion of the hanger member. The electric motor is disposed such that an output power shaft thereof may be located in a coaxial relationship with a pivot shaft, as disclosed, for example, in the official gazette of Japanese Utility Model Laid-Open Application No. 51-80848.

However, the electrically operated saddle type vehicle of the official gazette of Japanese Utility Model Laid-Open Application No. 51-80848 mentioned above has a problem that, since the battery is located forwardly of the electric motor, the cooling performance for the electric motor is thereby deteriorated.

In addition, an electrically operated vehicle is advantageous in that an electric motor is utilized to drive the driving wheel. Thus, the vehicle does not discharge exhaust gas. Accordingly, the vehicle may be employed in a special environment such as indoors.

However, in a conventional electrically operated vehicle as described in Japanese Utility Model Laid-Open Application No. 51-80848, a high torque is essential for an output of the electric motor and the electric motor must be energized with a high current. Consequently, there is a problem in that the heat generation of the electric motor is high and the electric motor is liable to be thermally fatigued.

As a conventional electrically operated two-wheeled vehicle, a vehicle is known which is disclosed, for example, in the Official Gazette publication of Japanese Utility Model Laid-Open Application No. 51-80848. In the electrically operated two-wheeled vehicle, a driving sprocket wheel is mounted on an output power shaft of an electric motor while a driven sprocket wheel is mounted on a rear wheel. A chain is stretched between the sprocket wheels to interconnect the electric motor and the rear wheel.

However, with the conventional electrically operated two-wheel vehicle described above, in order to change the speed of the vehicle, the speed of rotation of the electric motor must be controlled. There is a problem in that it is difficult to operate the electric motor always in a high efficiency. Thus, a savings in power consumption cannot be achieved.

The problem described above can be solved by assembling a transmission mechanism in operative relationship relative to the electric motor and changing the speed of the output of the electric motor by means of the transmission mechanism. Since an assembly of the electric motor and the transmission mechanism, power unit, is increased in size and also in weight, it is believed that the construction would be difficult.

In a motorcycle of the electric motor driven type, it is common practice that an electric motor serving as a driving source is supported by means of a body frame at a lower portion of the body frame, as described in Japanese Utility Model Laid Open Application No. 51-80848.

However, such a conventional vehicle as described above has a drawback because the electric motor is located at a lower portion of the body near to the ground. The motor is liable to be adversely affected by dust or water from the ground.

SUMMARY AND OBJECTS OF THE INVENTION

The present invention has been made in view of the problem described above and provides and electrically operated saddle type vehicle which can achieve improvement in cooling performance of an electric motor.

An electrically operated saddle type vehicle of the present invention includes a front wheel which is supported on a front wheel supporting member mounted at a front portion of a body frame while a rear wheel is supported on a rear wheel supporting member mounted at a rear portion of the body frame. An electric motor is suspended between a mounting portion of the front wheel supporting member and the rear wheel supporting member on the body frame such that a front portion thereof is opposed to the front wheel. The electric motor is connected to at least one of the front and rear wheels by way of a power transmitting mechanism.

In the electrically operated saddle type vehicle according to the present invention, since the electric motor is disposed such that the front portion thereof is opposed to the front wheel, a driving wind can collide directly with the electric motor to cool the electric motor and the cooling performance of the electric motor can be improved.

It is an object of the present invention to provide a cooling apparatus for effectively cooling an electric motor.

According to the present invention, a cooling apparatus for an electrically operated vehicle includes a cooling water passageway provided for the electric motor, and a pump for supplying cooling water to the cooling water passageway.

The cooling apparatus for an electrically operated vehicle of the present invention can effectively cool the electric motor since heat of the electric motor is absorbed by the cooling water supplied from the pump to the cooling water passageway.

The present invention provides a saving in power consumption. It is an object of the present invention to provide a driving apparatus for an electrically operated two-wheeled vehicle which is easy in layout and can operate an electric motor in a high efficiency.

According to the present invention, a driving apparatus for an electrically operated two-wheeled vehicle wherein output power of an electric motor is changed in speed by a non-stage transmission. The power changed in speed by the non-stage transmission is transmitted to a driving wheel by way of a wrapping connector to drive the driving wheel. The electric motor and the non-stage transmission are assembled integrally to each other and suspended at a lower portion of a body frame. The electric motor and the non-stage transmission are disposed such that a straight line interconnecting a rotary shaft of the electric motor and an output power shaft of the non-stage transmission may extend substantially in parallel to the body frame as viewed in side elevation.

With the driving apparatus for an electrically operated two-wheeled vehicle according to the present invention, since the electric motor and the non-stage transmission are assembled integrally to each other and disposed at the lower portion of the body frame, the location of the center of gravity at a low position can be achieved. Further, since the electric motor and the non-stage transmission are disposed such that the straight line interconnecting the rotary shaft of the electric motor and the output power shaft of the non-stage transmission may be substantially in parallel to the body frame as viewed in the side elevation, a dead space below the body frame can be utilized effectively and a layout can be easily achieved.

The driving apparatus for an electrically operated two-wheeled vehicle of the present invention provides a swing arm mounted for rocking motion around a pivot shaft on the body frame by means of the pivot shaft. The driving wheel is supported on the swing arm adjacent to the output power shaft of the non-stage transmission. The pivot shaft is disposed in a coaxial relationship with the transmission. A driving wheel of the wrapping connector is securely mounted on the output power shaft of the non-stage transmission. Variation in tensile force of an endless transmitting member of the wrapping connector can be reduced upon bounding or rebounding of the driving wheel.

Further, in the driving apparatus for an electrically operated two-wheeled vehicle of the present invention, where the electric motor and the non-stage transmission are disposed such that the electric motor is located forwardly on the vehicle, the electric motor can be effectively cooled.

It is an object of the present invention to provide an electrically operated vehicle which is not influenced by dust, rainwater or the like from the ground for providing an improvement in facility of maintenance of the electric motor.

An electrically operated vehicle includes an electric motor serving as a driving source and an output power shaft connected to a driving wheel disposed on the upper side and the lower side, respectively. A transmission is interposed substantially at the center of the body frame between the electric motor and the output power shaft. Further, a battery is disposed forwardly of the output power shaft and the transmission. The electric motor is of the air cooling type having a fan built therein. Since the electric motor is located on the upper side of the output power shaft and the transmission and located at a position spaced away from the ground and the lower side of the electric motor is covered by the output power shaft and the transmission, dust, water or the like is not able to directly enter into the electric motor.

In addition, the electric motor disposed above the body frame can be removed or inserted readily from the side of the body independently of the output power shaft and the transmission. Improvement in maintenance can be achieved.

The electric motor includes a cooling function. Even if the cooling unit is disposed at a location rearwardly of the battery where the cooling unit is not exposed very much to a driving wind, there is no trouble in the functioning of the cooling unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
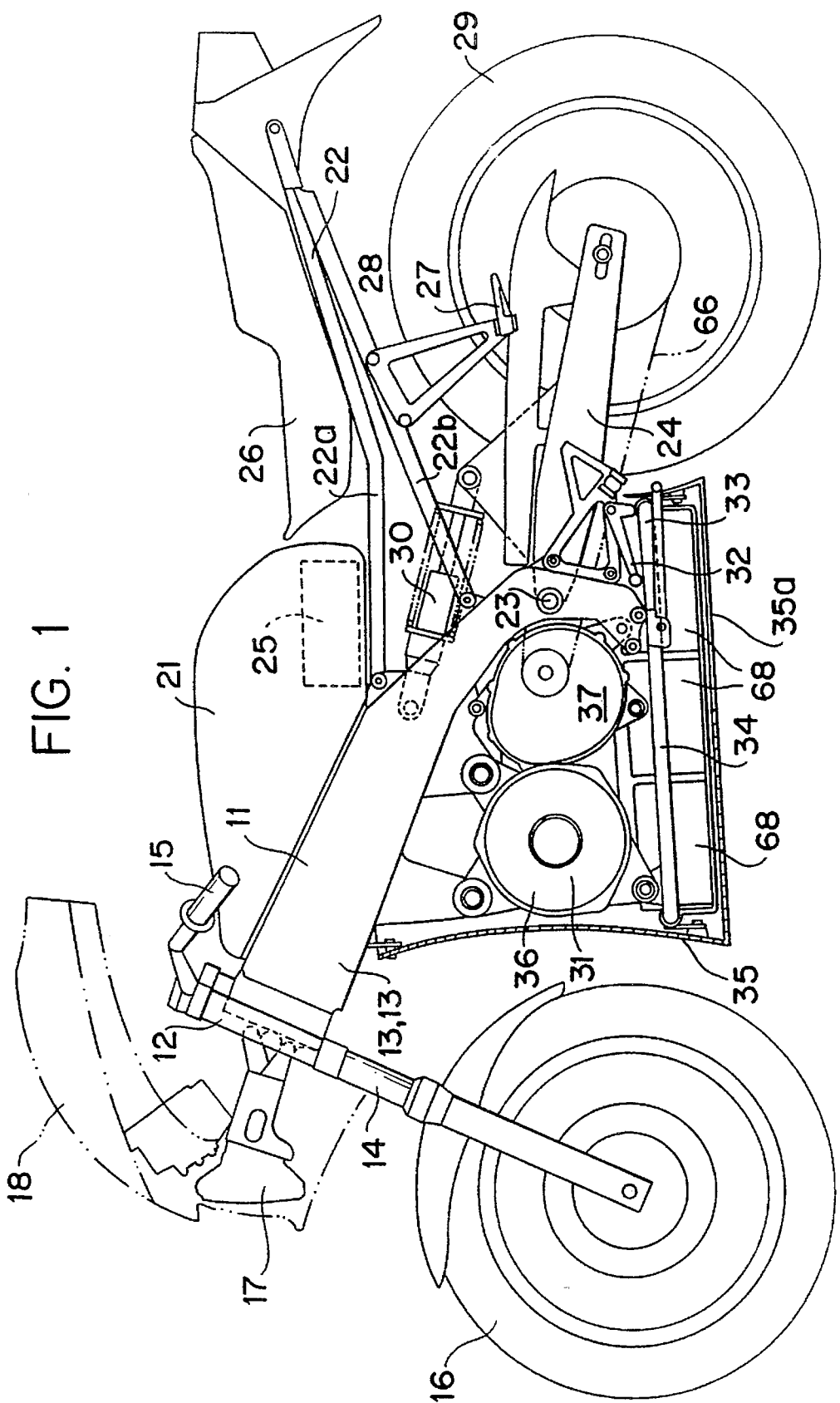
FIG. 1 is a side elevational view of an electrically operated saddle type vehicle according to the present invention.
Figure 2:
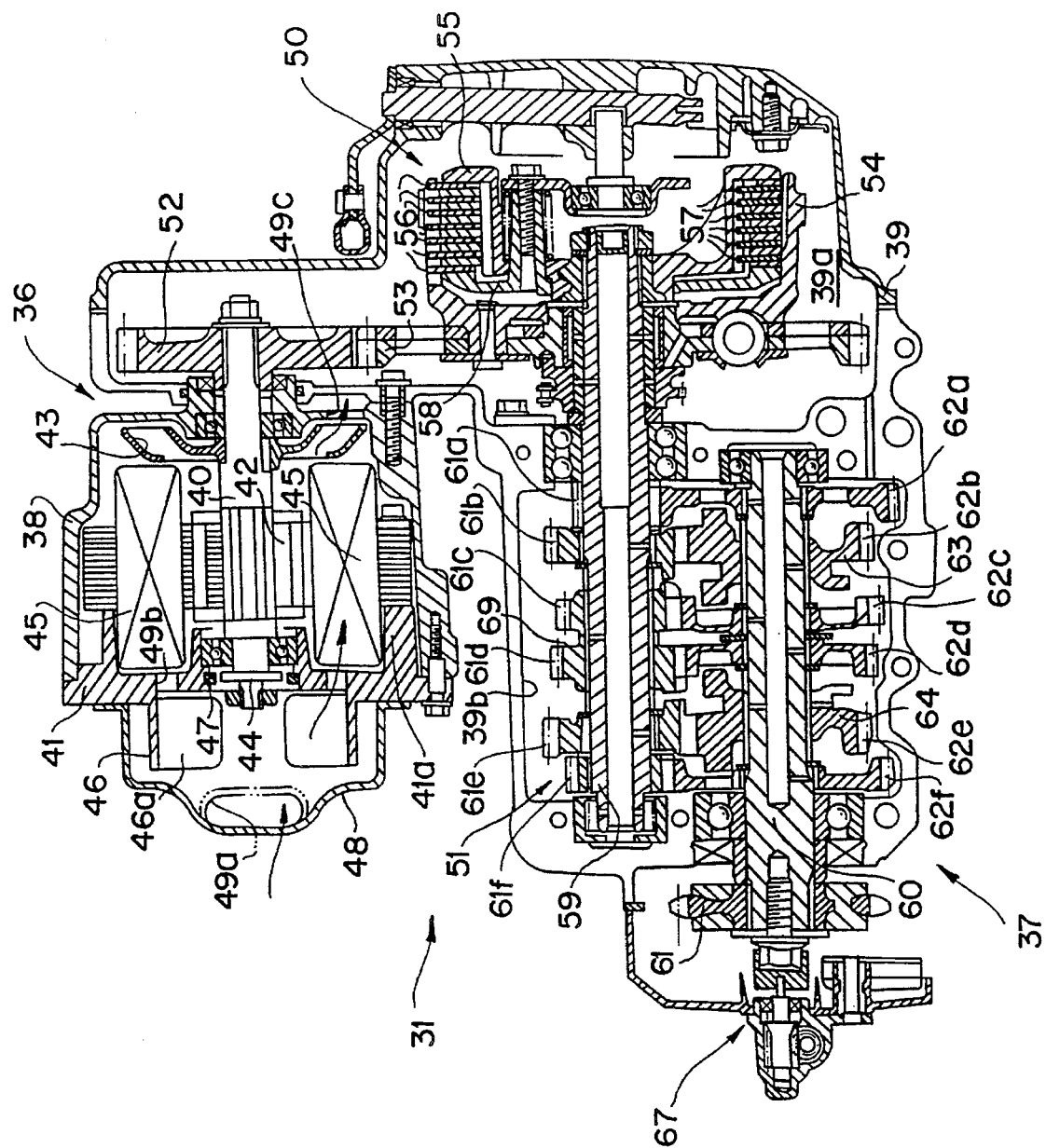
FIG. 2 is a sectional view of an essential portion of the electric motor.

Embodiments of the present invention will be described with reference to the drawings wherein FIGS. 1 and 2 show a first embodiment of an electrically operated two-wheels vehicle, electrically operated saddle type vehicle. FIG. 1 is a side elevational view and FIG. 2 is a sectional view of principal portions thereof.

Referring to FIG. 1, a body frame 11 includes a pair of left and right main frames 13, 13 which are mounted at front ends thereof on a head tube, mounting portion 12 and extend obliquely, rearwardly downwards. A cross member, not shown, is provided between the main frames 13, 13. A front wheel supporting member 14 is supported for steering operation within the head tube 12. A steering handle 15 is provided at an upper portion of the front fork 14 while a front wheel 16 is supported at a lower portion of the front fork 14. In addition, a head lamp 17 and a wind screen 18 are mounted at the front portion of the head tube 12.

A box 21 is positioned at upper portions of the main frames 13, 13 and a seat frame 22 extends rearwardly at an intermediate location below the box 21. A pivot shaft, mounting portion 23 is provided at lower portions of rear ends of the main frames 13, 13. A swing arm rear wheel supporting member 24 is mounted for rocking motion on the pivot shaft 23 and extends rearwardly. The box 21 is formed such that at least a portion thereof may be opened. A controller 25, for the control of an electric motor, is disposed in the box 21. In addition, an article accommodating section, not shown, is defined in the box 21. The seat frame 22 includes a pair of left and right seat rails 22a, 22a having front ends connected to the main frames 13, 13. A pair of left and right seat stays 22b, 22b having front ends connected to the main frames 13, 13 are connected at rear ends thereof to each other in such a manner as to form a triangular frame as viewed in side elevation. A seat 26 is positioned at an upper portion of the seat frame 22 while a pillion step 27 is provided at an intermediate portion of the seat frame 22 by a stay 28. A rear wheel 29, connected to a power unit 31, which will be hereinafter described, is supported at a rear end of the swing arm 24. A cushion unit 30 is interposed between the swing arm 24 and the main frames 13. Further, a speed change pedal 32 and a stand 33 are operatively connected adjacent to a lower end of the body frame 11.

The power unit 31 and a battery frame 34 are suspended at lower portions of the main frames 13, 13. The power unit 31 and battery frame 34 are surrounded by a cover 35. The battery frame 34 has a substantially cage-like configuration and is suspended at a lower portion of the power unit 31. A plurality of batteries 68, 68, 68 wired in parallel or in series to each other are carried on the battery frame 34. The batteries 68 are connected to the aforementioned controller 25 and an electric motor of the power unit 31. The cover 35 has a substantially L-shaped profile as viewed in side elevational section and is mounted at front and rear portions of an upper portion thereof on the main frames 13 and at front and rear portions of a lower portion thereof on the battery frame 34. A wind introducing hole, not shown, is formed at a front portion of the cover 35 in an opposing relationship to the power unit. A wind discharging hole 35a is formed at a lower rear portion of the cover 35.

As shown in FIG. 2, the power unit 31 is constructed such that a brushless dc electric motor 36 and a transmission 37 are assembled relative to each other as shown in FIG. 2. The electric motor 36 includes a bottomed cylindrical motor case 38, opened at a left end and closed at a right end thereof. The motor case 38 is secured to a transmission case 39 of the transmission 37. A rotary shaft 40 extends through and is supported for rotation on the closed end of the motor case 38. A stator housing 41, substantially in the form of a disk, is mounted at the open end of the motor case 38 to close the opening. A left end of the rotary shaft 40 is supported for rotation on the stator housing 41. A permanent magnet 42 including a rotor is mounted at a substantially central portion of the rotary shaft 40.

A fan 43 is mounted at a portion of the rotary shaft 40 to the right of the permanent magnet 42 adjacent the closed end of the motor case 38. A magnet 44 having a plurality of magnetic poles for the detection of rotation is securely mounted at an end portion of the rotary shaft 40 which extends outwardly of the stator housing 41. The rotary shaft 40 extends at a right end thereof into the transmission case 39. A drive gear 52 is mounted at the right end of the rotary shaft 40 and is connected to a clutch, which will be hereinafter described. A plurality of coils 45 constituting a stator are mounted at a cylindrical portion 41a on one face of the stator housing 41 which extends into the motor case 38. A heat sink 46 having fins 46a thereon is formed integrally on the other face of the stator housing 41. A rotation detector 47 having a Hall effect element is provided in an opposing relationship to the magnet 44 of the rotary shaft 40. Though not shown clearly in the drawings, an FET, field effect transistor, is connected to the controller 25 and the coils 45 described hereinabove. The FET includes a motor driving circuit provided on the heat sink 46. In addition, the rotation detector 47 is connected to the controller.

A cover 48 is mounted on the stator housing 41 and covers the aforementioned FET. Vent holes 49a, 49b and 49c are formed in the cover 48, motor housing 41 and motor case 38, respectively. The inside of the motor case 38 is ventilated as indicated by arrow marks in FIG. 2 by rotation of the fan 43 so that the coils 45 are cooled.

The electric motor 36, described hereinabove, is disclosed in detail in Japanese Patent Application No. 1-181496 or Japanese Utility Model Application No. 2-51139 which have been previously filed by the present inventors and incorporated herein by reference. Thus, a detailed description thereof is not provided herewith.

The transmission 37 includes a clutch chamber 39a and a transmission chamber 39b which are defined in the transmission case 39. A multiple disk type clutch 50 is disposed in the clutch chamber 39a while a transmission mechanism 51 of the parallel gear type is disposed in the transmission chamber 39b. The clutch 50 includes a driven gear 53 which is held in meshing engagement with a drive gear 52 of the rotary shaft 40 of the electric motor 36. A clutch outer member 54 is provided while a clutch inner member 55 is mounted on a main shaft of the transmission mechanism 51. Pressure plates 56 supported on the clutch outer member 54 and pressure plates 57 supported on the clutch inner member 55 are engaged for alternate frictional contact with each other in an axial direction such that the pressure plates 56 and 57 are frictionally contacted with each other by axial movement, movement to the right in FIG. 2, of a pressing member 58 connected to a clutch lever, not shown, to transmit power.

The transmission mechanism 51 includes a main shaft 59 and a counter shaft 60 which are disposed in parallel to each other in the transmission chamber 39b such that a right end of the main shaft 59 extends into the clutch chamber 39a and the clutch inner member 55 is mounted at the right end of the main shaft 59 as described hereinabove. A left end of the counter shaft 60 extends outwardly of the transmission case 39 and a sprocket wheel 61 is provided at the left end of the counter shaft 60. Speed change gears 61a, 61b, 61e and 61f and a shifter 69 having speed change gears 61c and 61d formed thereon are provided corresponding to a number of speeds on the main shaft 59. Speed change gears 62a, 62c, 62d and 62f, a shifter 63 having a speed change gear 62b formed thereon and another shifter 64 having a speed change gear 62e formed thereon are provided on the counter shaft 60. The shifters 63, 64 and 69 are held in engagement with shift forks, not shown, which are moved in response to a treadling operation of the speed change pedal 32. In the transmission mechanism 51, the shifters 64, 65 and 69 are selectively moved in an axial direction by a treadling operation of the speed change pedal 32 to effect speed changing. Though not shown clearly in FIG. 2, a chain power transmitting mechanism 66 is stretched between the sprocket wheel 61 and another sprocket wheel provided on an axle of the rear wheel 29. A vehicle speed detector 67 is connected to the aforementioned controller 25.

Subsequently, operation of the present embodiment will be described. In the electrically operated two-wheeled vehicle, an operational angle of an accelerator grip of the steering handle 15 is detected by an accelerator sensor not shown. The speed of rotation of the rotary shaft 40 of the electric motor 36 is detected by the rotation detector 47. The speed of the vehicle is detected by the vehicle speed detector 67. A shift position of the transmission mechanism 51 and a condition of the clutch 50 are detected by respective sensors. Thereafter, in accordance with the detection signals, the controller 25 determines the conditions of the vehicle and energizes the electric motor 36 to cause the rear wheel 29 to be driven by the electric motor 36 to drive the vehicle. The controller 25 operates the electric motor 36 in the highest efficiency, for example, as described also in the precedent Japanese application to achieve a saving in the power consumption.

Meanwhile, in the electrically driven two-wheeled vehicle, the electric motor 36 is disposed at a forwardmost position in the cover 35 such that a front portion thereof is opposed to the air introducing hole of the cover 35 so that a driving wind collides with the electric motor 36 by way of the air introducing hole of the cover 35. Consequently, the electric motor 36 can radiate, upon driving, the heat generated from the coils 45 or the FET by energization. Thus, a high cooling performance can be obtained. More particularly, because the fan 43 is rotated together with the rotary shaft 40 of the electric motor 36 to ventilate the inside of the motor case 38, forced air cools the inside of the motor case 38. The temperature rise of the coils 45 and so forth can be prevented.

Meanwhile, in the present electrically operated two-wheeled vehicle, the power unit 31 is suspended below the main frames 13. The batteries 68 are suspended below the power unit 31, consequently, the power unit 31 and the batteries 68 having a great weight can be disposed on a lower side with respect to the body frame 11 to achieve a location of the center of gravity at a low position and obtain a high degree of driving stability.

Figure 3:
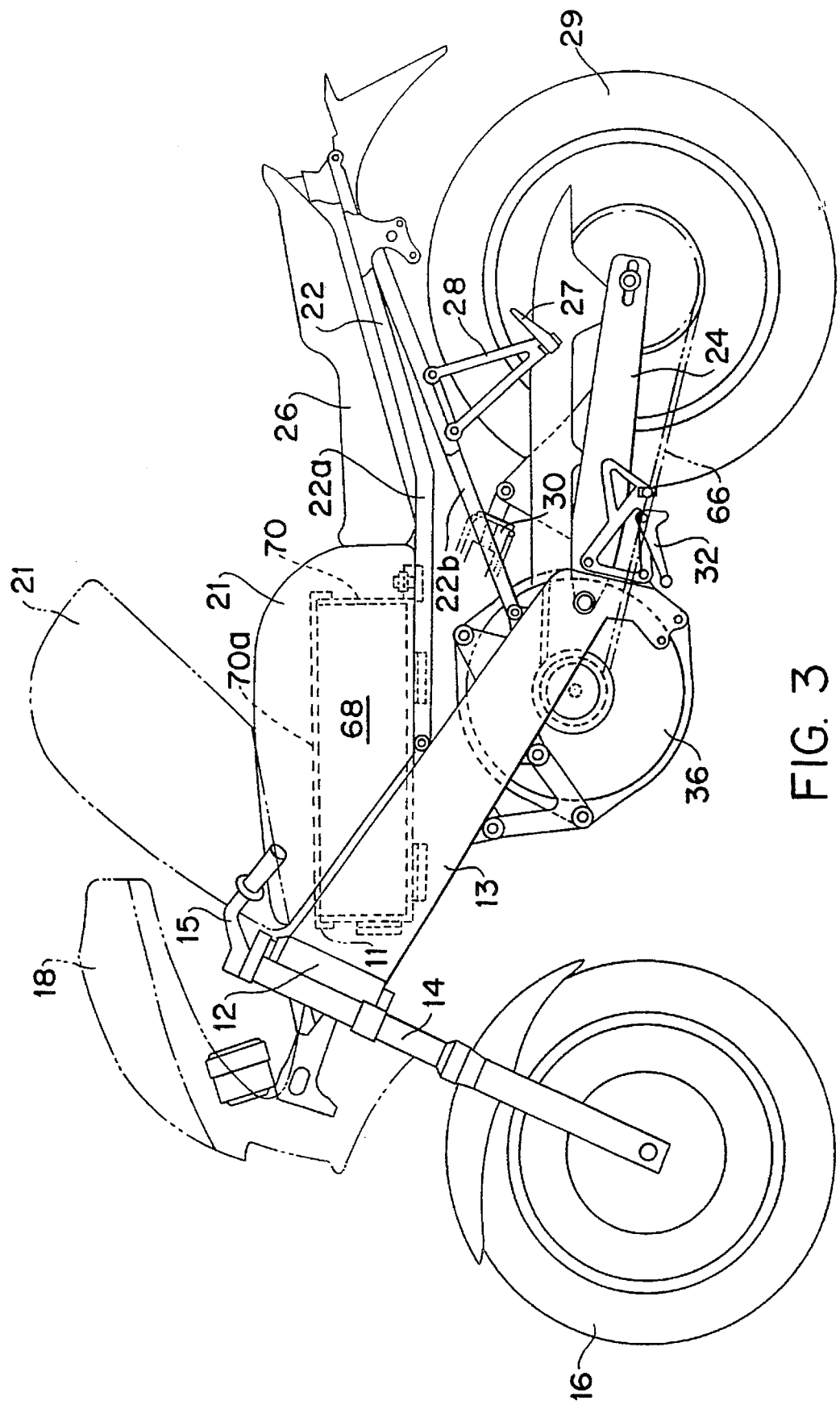
FIG. 3 is a side elevational view of a second embodiment of the present invention.
Figure 4:
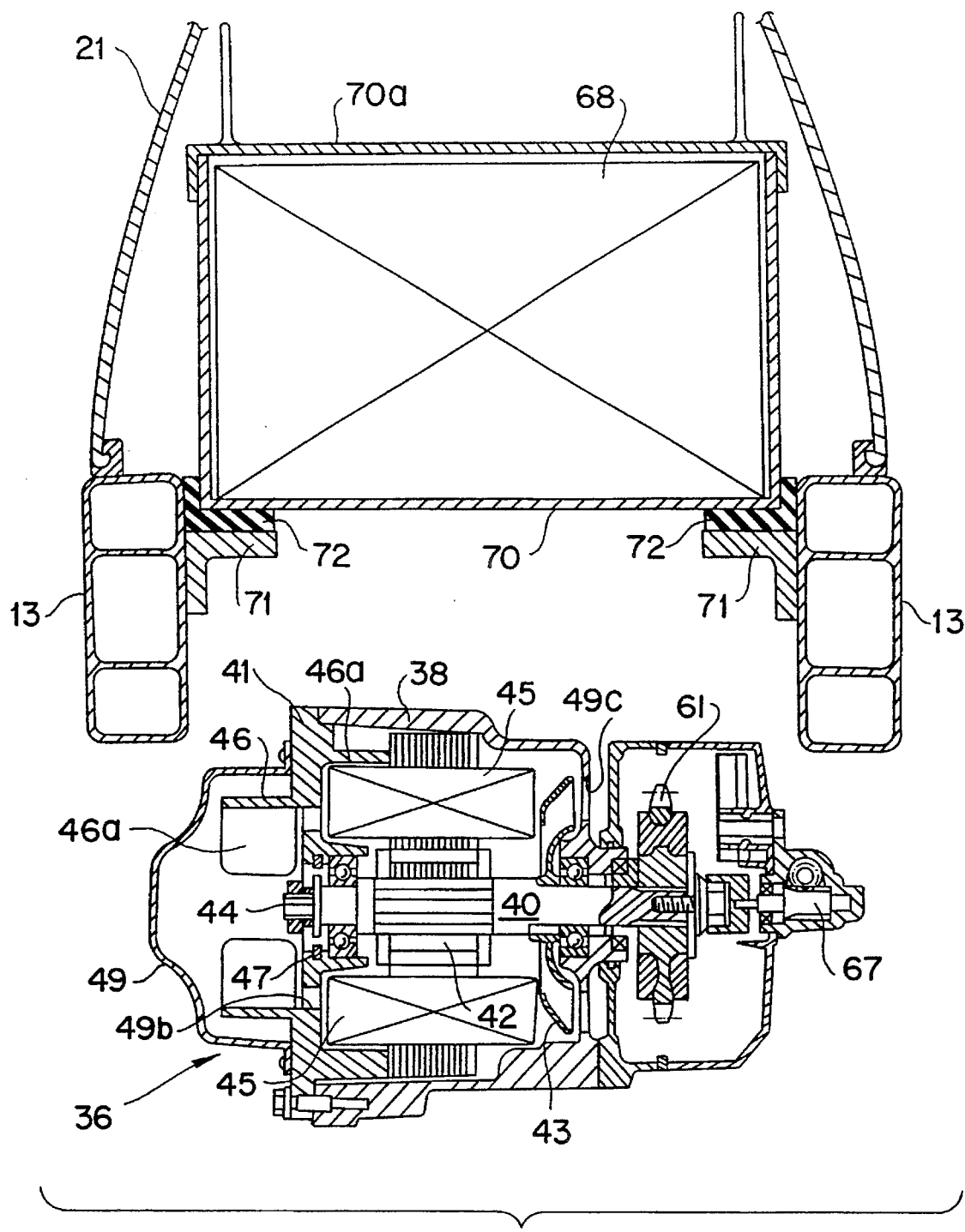
FIG. 4 is a front elevational sectional view thereof.

FIGS. 3 and 4 show a second embodiment of the present invention. In the second embodiment and several embodiments which will be hereinafter described, like reference numerals are applied to like portions to those of the first embodiment described above and a description thereof will be omitted herein.

In the second embodiment, a battery case 70 having batteries 68 accommodated therein is mounted in a box 21. The box 21 is supported at a front portion thereof for pivotal motion. The battery case 70 is mounted, by way of rubber members 72, 72, between brackets 71, 71 mounted on inner faces of main frames 13, 13. The battery case 70 is opened at an upper portion thereof. A lid 70a is provided for opening and closing movement at the upper portion.

In the second embodiment, a sprocket wheel 61 is mounted directly on a rotary shaft 40 of an electric motor 36. A chain 66 is stretched between the sprocket wheel 61 and another sprocket wheel on a rear wheel 29. The batteries 68 are carried in the box 21 and are spaced apart a large distance. The layout is easy and a large number of batteries 68 can be carried in the box 21.

The electrically operated two-wheeled vehicle includes the sprocket wheel 61 which is mounted directly on the rotary shaft 40 of the electric motor 36. Energization of the electric motor 36 is controlled to effect speed changing equivalent to the transmission 37. Further, miniaturization and reduction in weight can be achieved.

Figure 5:
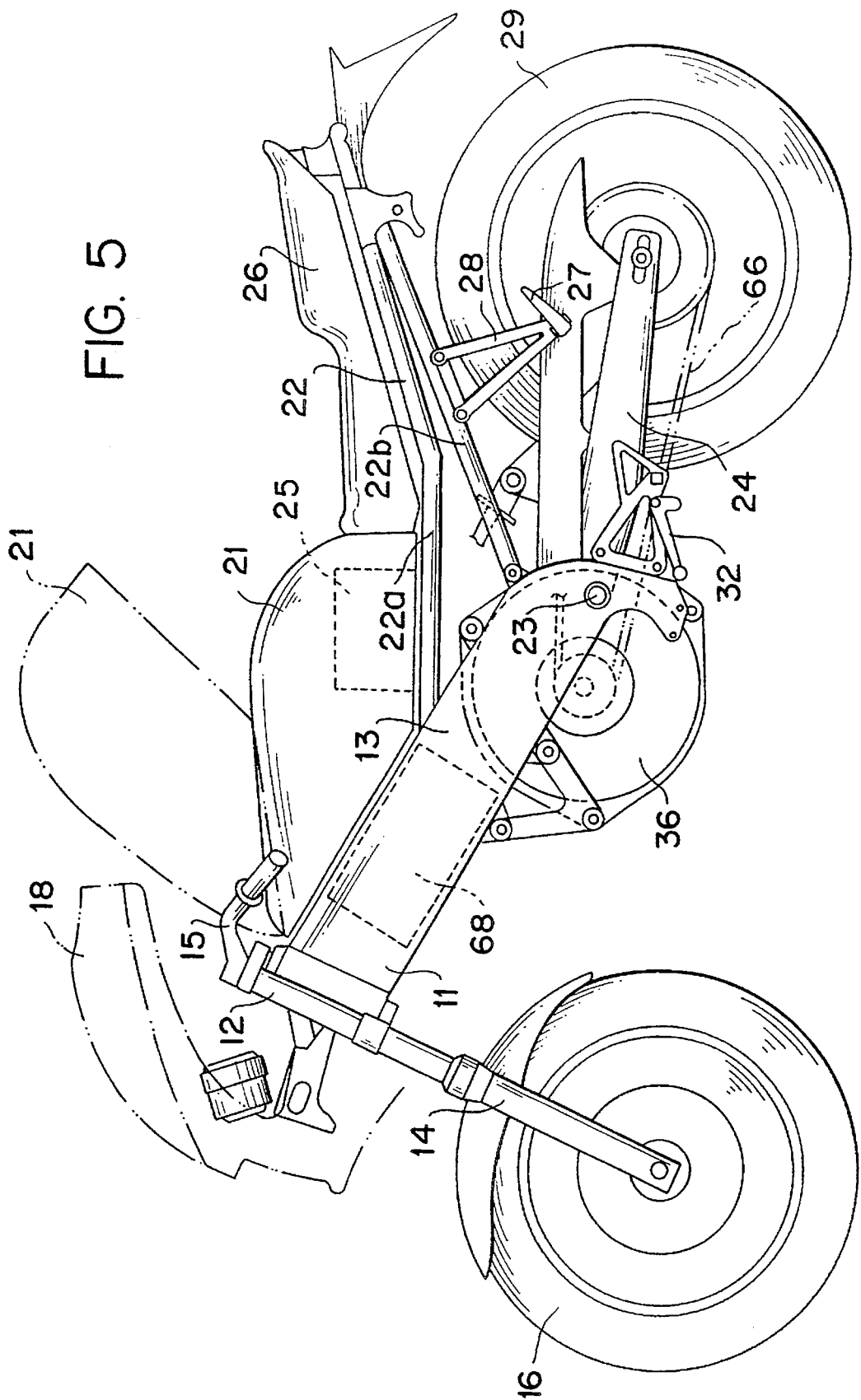
FIG. 5 is a side elevational view of a third embodiment of the present invention.
Figure 6:
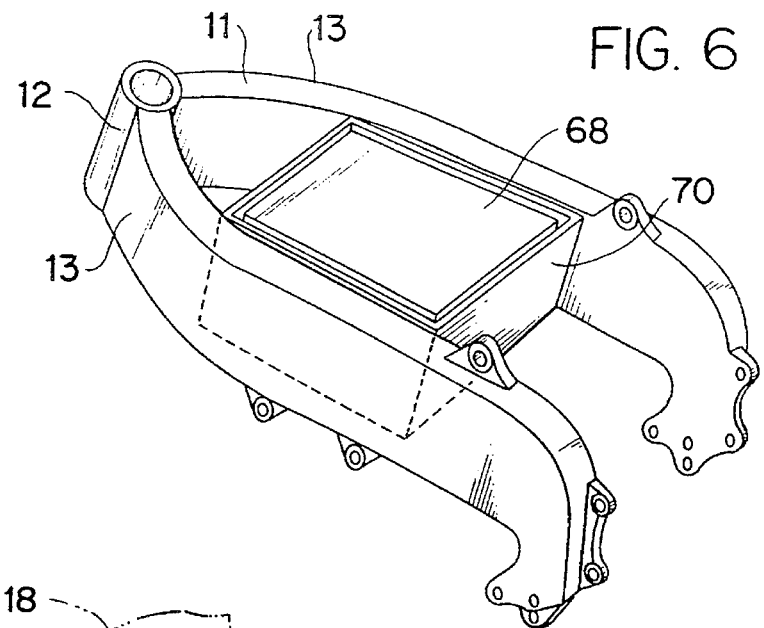
FIG. 6 is a perspective view of a principal portion thereof.

FIGS. 5 and 6 show a third embodiment of the present invention. A case 70 may be opened at an upper portion thereof between left and right main frames 13', 13'. Batteries 68 are carried in the case 70'.

Because the batteries 68 are positioned between the main frames 13', 13' which provide a dead space therebetween, no adverse influence occurs on the layout of any other mechanism. Further, miniaturization can be achieved. Also, designing or the like is facilitated.

Figure 7:
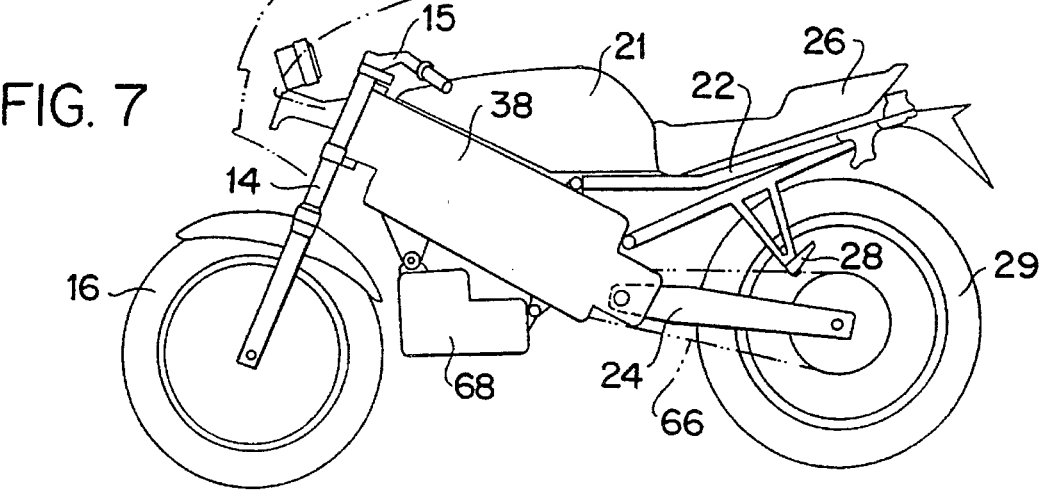
FIG. 7 is a side elevational view of a fourth embodiment of the present invention.

A fourth embodiment of the present invention is shown in FIG. 7. A motor case 38' of an electric motor 36 is used as a main frame. A front portion of the motor case 38' is mounted on a head pipe 12 while a swing arm 24 is supported at a rear portion of the motor case 38'. Though not shown clearly in FIG. 7, the electric motor 36 includes an air introducing hole formed in the motor case 38'. A rotor, a stator and so forth are assembled in the motor case 38' similarly to the first embodiment described hereinabove. Meanwhile, a bevel gear mechanism, a sprocket wheel and so forth are provided in the motor case 38' and a rotary shaft is connected to the sprocket wheel by way of the bevel gear mechanism. Batteries 68' are suspended on a lower side of the motor case 38'.

In the fourth embodiment, since the motor case 38' of the electric motor 36 is used as the main frame, there is no necessity of assuring the location for the electric motor 36. Further, miniaturization can be achieved.

Figure 8:
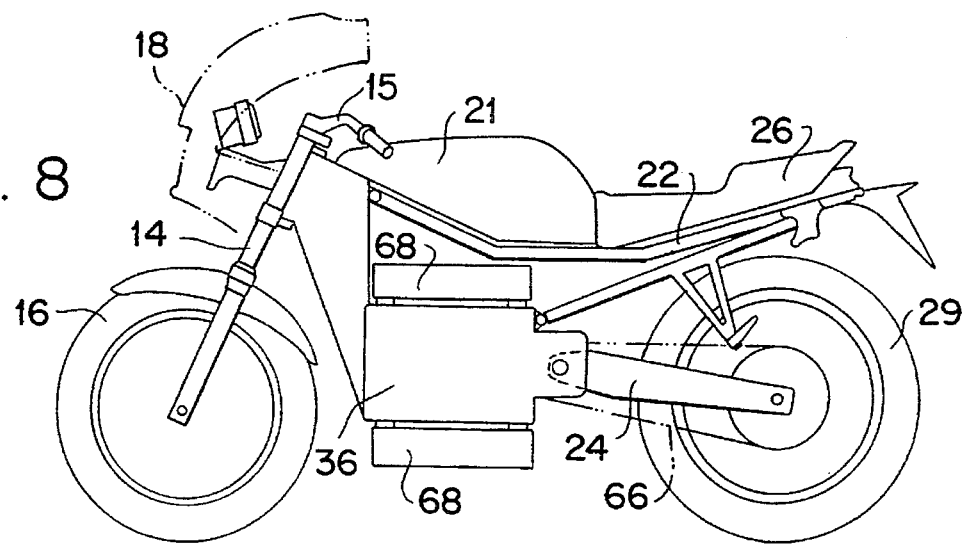
FIG. 8 is a side elevational view of a fifth embodiment of the present invention.

A fifth embodiment of the present invention is illustrated in FIG. 8. Batteries 68", 68" are disposed above and below an electric motor 36". The batteries 68" 68" are individually wired in parallel or in series to each other.

The batteries 68", 68" are disposed separately from each other. The degree of freedom in layout of the batteries 68", 68" is high and the layout of any other mechanism is not restricted. Designing is facilitated.

While an electrically operated two-wheeled vehicle is illustrated in each of the embodiments described hereinabove, the present invention can also be applied to a three-wheeled vehicle.

As described hereinabove, an electrically operated saddle type vehicle according to the present invention includes an electric motor which is opposed to a front wheel so that a driving wind may collide directly with the electric motor. The electric motor can be cooled with a driving wind and a high cooling performance can be obtained.

Figure 9:
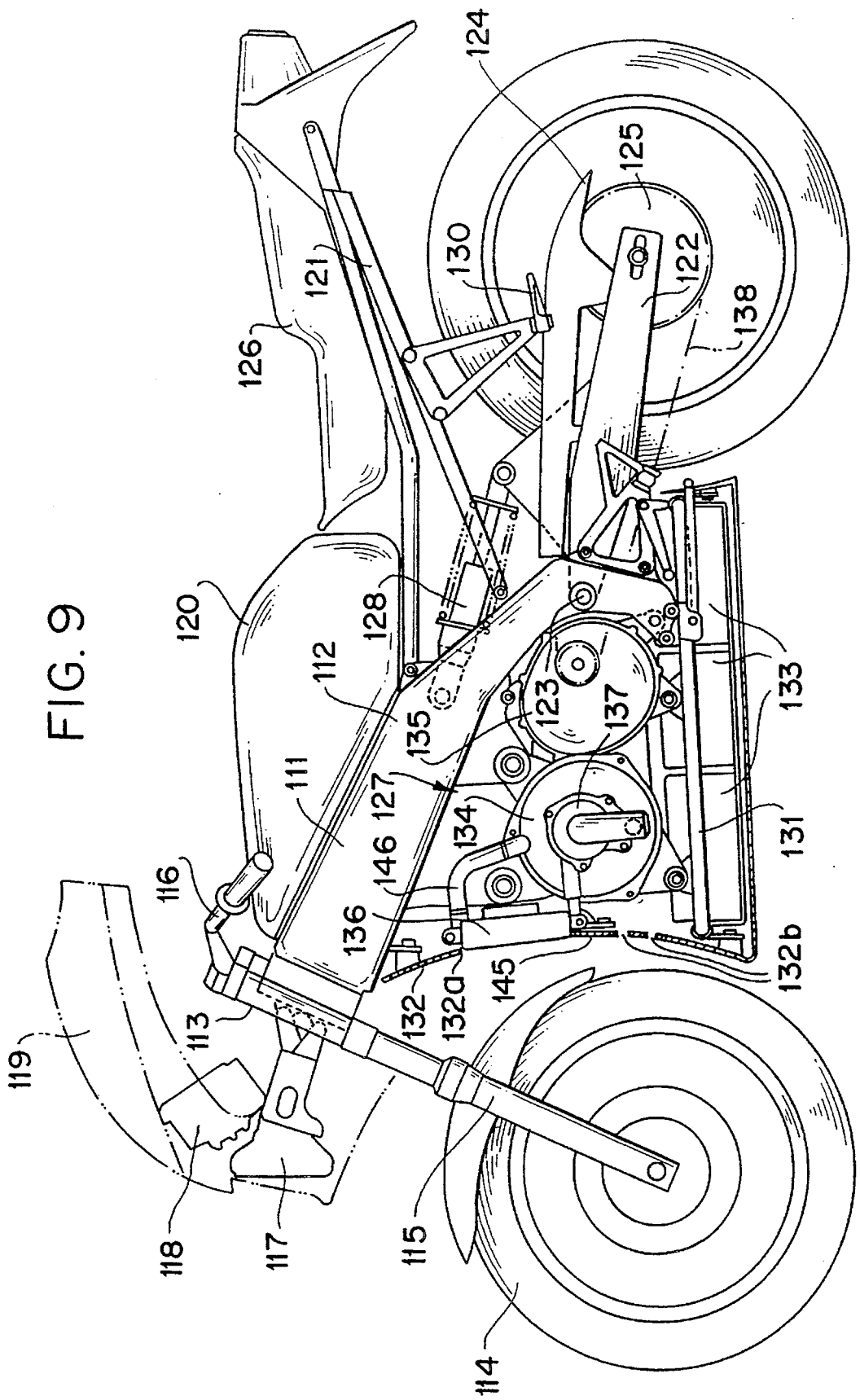
FIG. 9 is a side elevational view of an electrically operated two-wheeled vehicle illustration a cooling apparatus attached thereto.
Figure 10:
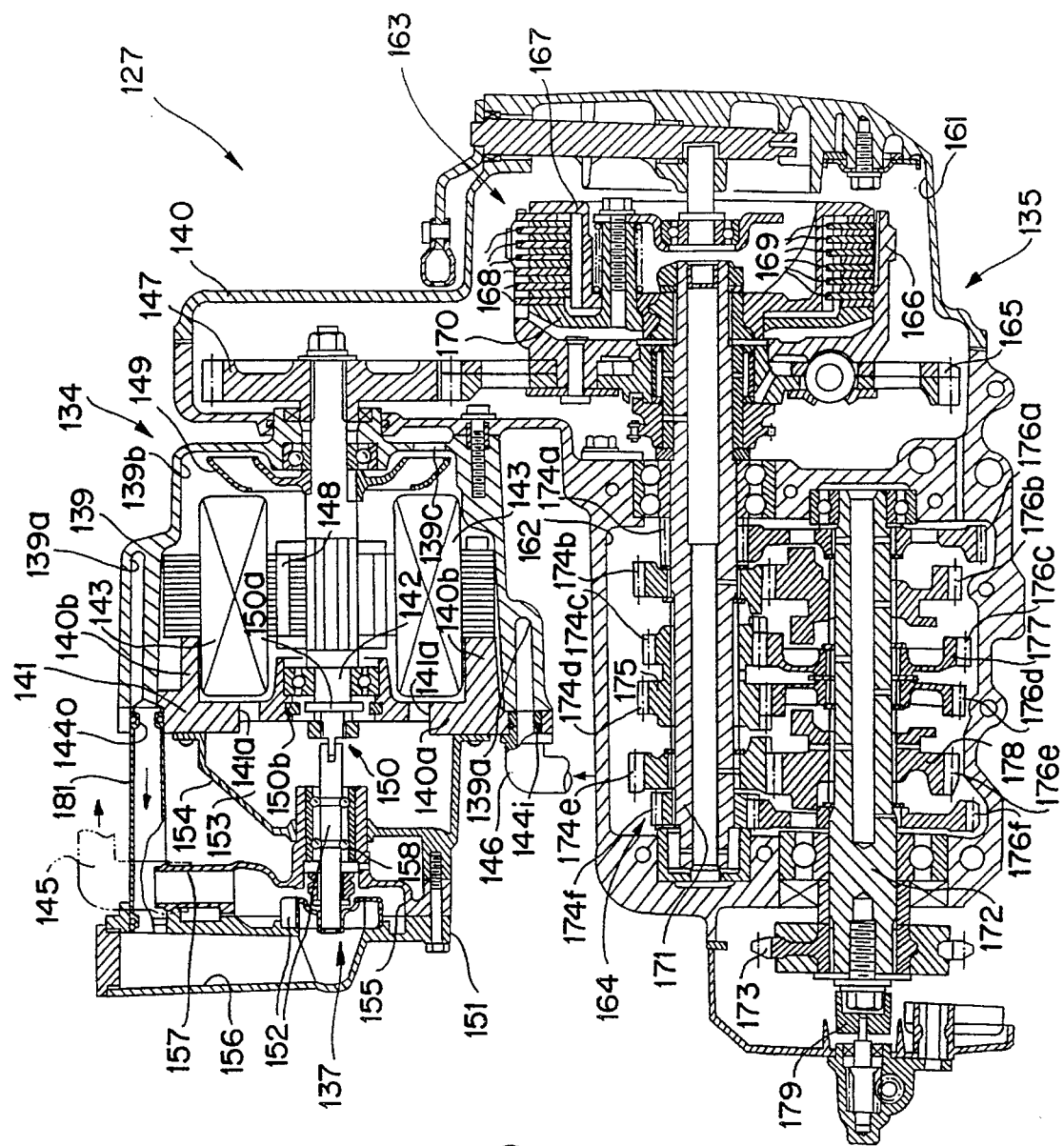
FIG. 10 is a sectional view of an essential portion.

FIGS. 9 and 10 illustrate a cooling apparatus for an electrically operated vehicle according to another embodiment of the present invention. Referring to FIG. 9, a body frame 111 includes a pair of left and right main frames 112, 112 which are mounted at front ends thereof on a head tube 113 and extend obliquely rearwardly and a cross member, not shown, is provided between the main frames 112, 112. A front wheel 114 is supported on the head tube 113 by way of a front fork 115 for steering operation by a steering handle 116. A head lamp 117, a meter box 118, and a wind screen 119 are operatively connected to the head tube 113.

A box 120 is positioned at an upper portion of the body frame 111. A seat frame 121 extends rearwardly from below the box 120 while a swing arm 122 is supported for rocking motion at a rear portion of the body frame 111 by a pivot shaft 123. Though not shown, a controller, which is connected to an electric motor which will be hereinafter described, and a battery and so forth, controls the electric motor and is disposed in the box 120. An article accommodating section for accommodating a tool and so forth therein is defined in the box 120. A seat 126 is placed at an upper portion of the seat frame 121. A rear wheel 124 is supported at a rear end of the swing arm 122. The rear wheel 124 has a driven sprocket wheel 125 mounted at a hub or the like thereof and is connected to a power unit, which will be hereinafter described, by way of a chain 138 so that power may be transmitted thereto. A cushion unit 128 and a pillion step 130 are operatively positioned relative to the main frames 112,112 and the rear of the vehicle.

A power unit 127 and a battery frame 131 are suspended on the main frame 111. Further, a cover member 132 is positioned adjacent to the power unit 127. The cover member 132 has a substantially L-shaped profile as viewed in side elevation and is mounted at a front upper portion thereof on the main frame 111 and at lower front and rear portions thereof on the battery frame 131. An opening 132a is formed in the cover member 132 in an opposing relationship to a radiator which will be hereinafter described. A large number of air introducing holes 132b are formed in the cover member 132 around the opening 132a so as to allow ventilation. The battery frame 131 is formed from pipe-shaped members assembled into a substantially cage-like configuration and is mounted at two forwardly and rearwardly spaced points on the power unit 127 and at a lower portion of the body frame 111 rearwardly of the power unit 127 and at a lower portion of the body frame 111 rearwardly of the power unit 127. A plurality of batteries 133 are carried on the battery frame 131. The batteries 133 are connected in parallel and in series to each other and connected to the controller and an electric motor of the power unit 127.

The power unit 127 is constructed such that, as shown also in FIG. 10, a dc electric motor 134 and a transmission 135 of the parallel gear type are assembled forwardly and rearwardly into a single body. A radiator 136 is mounted at a front portion of the electric motor 134 while a water pump 137 is mounted at a left side portion of the electric motor 134. The radiator 136 is in communication with a water jacket, hereinafter described, of the electric motor 134 by way of a hose 146 and also with the water pump 137 by way of a pipe 145 and cools cooling water admitted therein from the water pump 137. It is to be noted that construction of the radiator 136 is well known and description thereof is omitted herein.

The electric motor 134 is mounted in a bottom cylindrical motor case 139 including an accommodating portion 139b which is open to the left, as illustrated in FIG. 10. The bottom portion of the motor case 139 is mounted on a transmission case 140 of a transmission 135. A plurality of vent holes 139c are formed in the bottom portion of the motor case 139. A water jacket cooling water passageway 139a having a substantially annular section is formed in the motor case 139 in a coaxial relationship to the accommodating portion 139b. The vent holes 139c are formed in an opposing relationship to a fan which will be hereinafter described so as to allow ventilation therethrough. When the fan rotates, a cooling air passes through the vent holes 139c. The water jacket 139a is opened annularly to the same side as the opening of the accommodating portion 139b. The opening thereof is closed by a stator holding member 141 which will be hereinafter described. The water jacket 139a is communicated with the radiator 136 from an inlet port formed in the stator holding member 141 so that cooling water is supplied thereto. Further, the water jacket 139a is similarly in communication with the water pump 137 from an outlet port formed in the stator holding member 141 so that cooling water is discharged therefrom.

The stator holding member 141 is mounted at the opening end of the motor case 139. A rotary shaft 142 is supported for rotation inside the motor case 139 between the stator holding member 141 and the bottom portion. The stator holding member 141 has a plurality of holding pieces 140b integrally formed in an equidistantly spaced relationship in a circumferential direction projecting on an inner face of a lid portion 140a having a substantially disk-like configuration. The lid portion 140a closes the opening of the accommodating portion 139b and the opening of the water jacket 139a of the motor case 139. Coils 143 include a stator mounted on the individual holding pieces 140b. A plurality of vent holes 141a are formed in the lid portion 140a on the center side with respect to the holding pieces 149b. An inlet port 144i and an outlet portion 144o are formed at locations on the lid portion 140a corresponding to the opening of the water jacket 139a such that they are opened to the water jacket 139a. The vent holes 141a are formed in an opposing relationship to the coils 143 so as to allow ventilation. When the fan rotates, a cooling air passes through the vent holes 141a. The inlet portion 144i is connected to the hose 146 so that it is communicated with the radiator 136 by way of the hose 146 while the outlet port 144o is connected to a pipe 181 so that it is in communication with the radiator 136 by way of the pipe 181.

The rotary shaft 142 extends at the opposite ends thereof leftwardly and rightwardly through the stator holding member 141 and the bottom portion of the motor case 139. The left end thereof is connected to the water pump 137 while a driving gear 147, which is held in meshing engagement with a driven gear of the transmission 135 in the transmission case 140, is mounted at the right end of the rotary shaft 142. A well known magnet 148 constituting a rotor in the coils 143 is mounted on the rotary shaft 142 in the motor case 139. A fan 149 is securely mounted on the rotary shaft 142 in the neighborhood of the bottom portion of the motor case 139. The fan 149 is rotated integrally with the rotary shaft 142 to introduce a cooling air through the vent holes 141a. The cooling air which has cooled the coils 143 and so forth is discharged through the vent holes 139c.

A rotation sensor 150 includes a magnet 150a mounted on the rotary shaft 142 and a magnetic sensitive element 150b such as an MR element disposed in an opposing relationship to the magnet 150a. As is well known, the magnet 150a has a plurality of magnetic poles disposed in a direction of rotation of the rotary shaft 142 and the magnetic responsive element 150 operates in response to magnetism. The magnetic responsive element 50b of the rotation sensor 150 is connected to the controller and outputs a signal representative of a speed of rotation of the rotary shaft 142.

The water pump 137 is provided within a pump case 151 which is mounted on an outer edge portion of an outer periphery of the stator holding member 141 by means of a bracket 154 such that a central portion thereof is spaced from the outer face of the stator holding member 141. A spacing 153 is defined between the pump case 151 and the stator holding member 141. The spacing 153 is in communication with the atmospheric air by way of a hole or the like, not shown, formed in the bracket 154. The aforementioned vent holes 141*a* are opened to the spacing 153.

The pump case 151 has a pump chamber 155, a water sucking passageway 156, a water sending passageway 157 and a supporting hole 158 defined therein. A rotary shaft 152 extends in the supporting hole 158 in a coaxial relationship to the rotary shaft 142 of the electric motor 134. The rotary shaft 152 is connected at a right end thereof to the rotary shaft 142 of the electric motor 134 and extends at a left end thereof into the pump chamber 155. A blade 159 is mounted at the right end of the rotary shaft 152. The water sucking passageway 156 extends in a radial direction and is opened at an inner end thereof to a central portion of the pump chamber 155 while it is in communication at an outer end thereof with the outlet port 144*o* of the water jacket 139*a* by way of the pipe 181 mentioned hereinabove. Similarly, the water sending passageway 157 extends in a radial direction and is in communication at an inner end thereof with an outer peripheral portion of the pump chamber 155 while it is communicated at an outer end thereof with the radiator by way of the pipe 145. The water pump 137 is driven by the electric motor 134 so that the blade 159 is rotated to send out cooling water from within the water jacket 139*a* of the electric motor to the radiator 136.

The transmission 135 includes a clutch chamber 161 and a transmission chamber 162 which are defined in the transmission case 140. A multiple disk type clutch 163 is disposed in the clutch chamber 161. A transmission mechanism 164 of the parallel gear type is disposed in the transmission chamber 162. The clutch 163 includes a driven gear 165 which is held in meshing engagement with the aforementioned driving gear 147 which is provided on a clutch outer member 166 while a clutch inner member 167 is mounted on a main shaft of the transmission mechanism 164. As is well know, the clutch plates 168 and 169 are provided on the clutch outer member 166 and the clutch inner member 167, respectively. The clutch plates 168 and 169 are engaged for frictional contact with each other. In the clutch 163, a pressing member 170 is moved in an axial direction by operation of a clutch lever, not shown, to press the clutch plates 168 and 169. Power is transmitted through frictional contact between the clutch plates 168 and 169.

The transmission mechanism 164 includes a main shaft 171 and a counter shaft 172 which are disposed in parallel to each other in the transmission chamber 162 such that a right end of the main shaft 171 extends into the clutch chamber 161. The clutch inner member 167 described hereinabove is mounted at the right end of the main shaft 171 while a left end of the counter shaft 172 extends outwardly of the transmission case 140. A driving sprocket wheel 173 is securely provided at the left end of the counter shaft 172. Speed change gears 174*a*, 174*b*, 174*e* and 174*f* and a shifter 175 having speed change gears 174*c* and 174*d* formed thereon are provided corresponding to shift positions on the main shaft 171. Speed change gears 176*a*, 176*d* and 176*f*, a shifter 177 having a speed change gear 176*b* formed thereon and another shifter 178 having a speed change gear 176*e* formed thereon are provided on the counter shaft 172. The shifters 175, 177 and 178 are held in engagement with shift forks, not shown, which are connected to a speed change pedal, not shown, so that they are selectively moved in an axial direction by a treadling operation of the speed change pedal into a connected condition to a speed change gear to make integral rotation. A vehicle speed detector 179 is connected to the aforementioned controller and outputs a signal representative of a speed of the vehicle.

The chain 138 is stretched between the driving sprocket wheel 173 and the driven sprocket wheel 125 of the aforementioned rear wheel 124 so that the driving sprocket wheel 173 and the driven sprocket wheel 125 are interconnected for power transmission by way of the chain 138.

In the electrically operated two-wheeled vehicle of the present embodiment, the electric motor 134 is energized and power outputted from the electric motor 134 is changed in speed by the transmission 135. Power is transmitted from the transmission 135 to the rear wheel 124 to drive the electrically operated two-wheeled vehicle. Here, during energization of the electric motor 134. The water pump 137 circulates cooling water so that cooling water in the water jacket 139*a* flows into and is cooled by the radiator 136. Thereafter, the cooling water cooled by the radiator 136 flows into the water jacket 139*a* to cool the motor case 139. Further, in this instance, the fan 149 is rotated integrally with the rotary shaft 142 so that a cooling air flows through the vent holes 141*a* into the motor case 139. The cooling air passes through the motor case 139 and is discharged through the vent holes 139*c* to cool the coils 143 and so forth. Accordingly, even when a comparatively high current is supplied to the coils 143 to generate a great amount of heat, the electric motor 34 can be cooled effectively and a temperature rise of the electric motor 134 can be restricted.

Further, in the electric motor 134 of the present embodiment, the water jacket 139*a* is opened to the same side as the accommodating portion 139*b*. Further, the water jacket 139*a* is formed in such a shape that it has a substantially equal section in the opening direction. The shape facilitates removal from a die. The opening of the water jacket 139*a* is closed watertight by the stator holding member 141. Accordingly, the motor case 139 can be shaped readily by casting or the like.

As described so far, according to a cooling apparatus for an electrically operated vehicle of the present invention, an effect can be obtained in that an electric motor can be cooled effectively and a temperature rise of the electric motor can be restricted.

Figure 11:
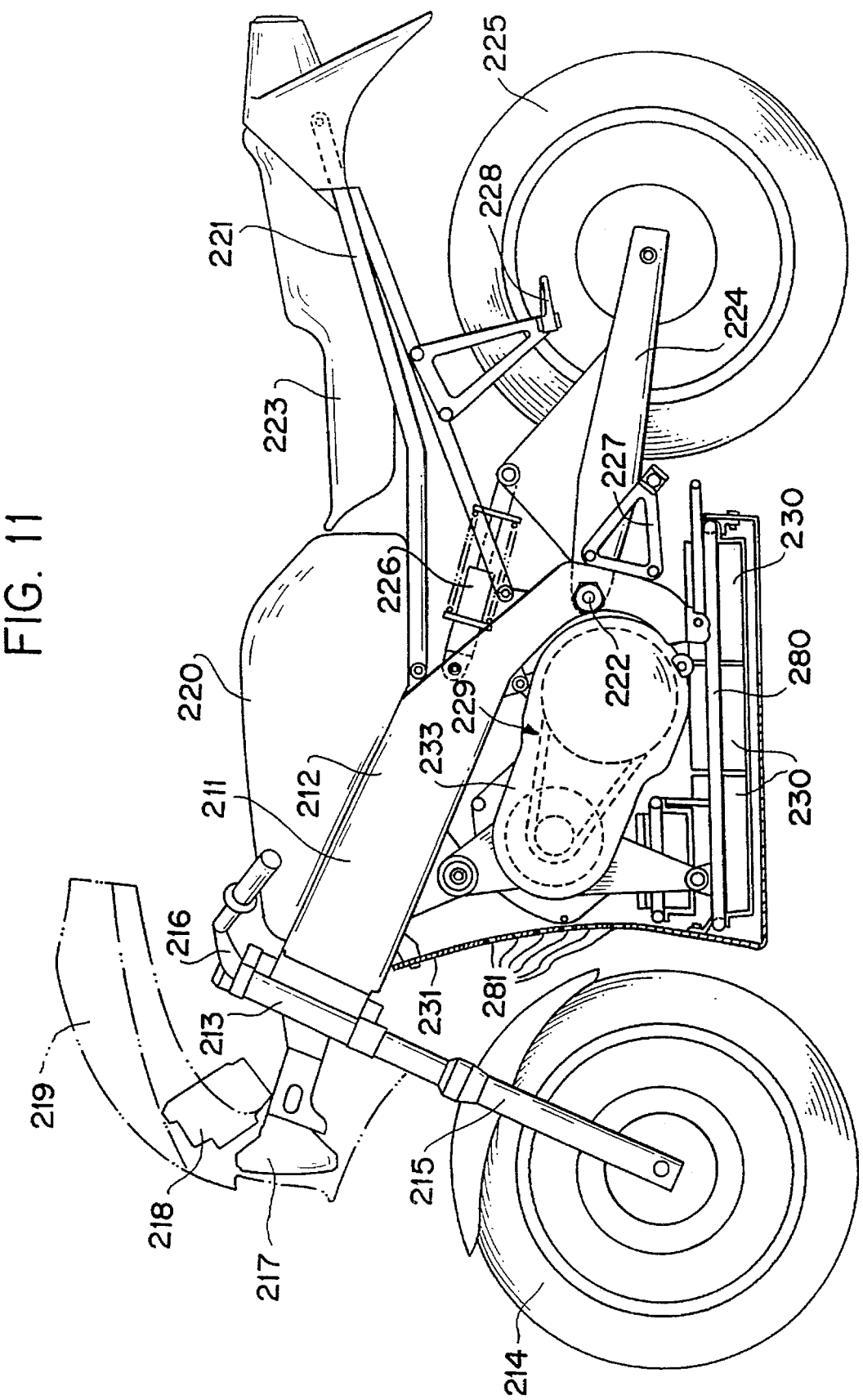
FIG. 11 is a side elevational view of an electrically operated two-wheeled vehicle showing a driving apparatus.
Figure 12:
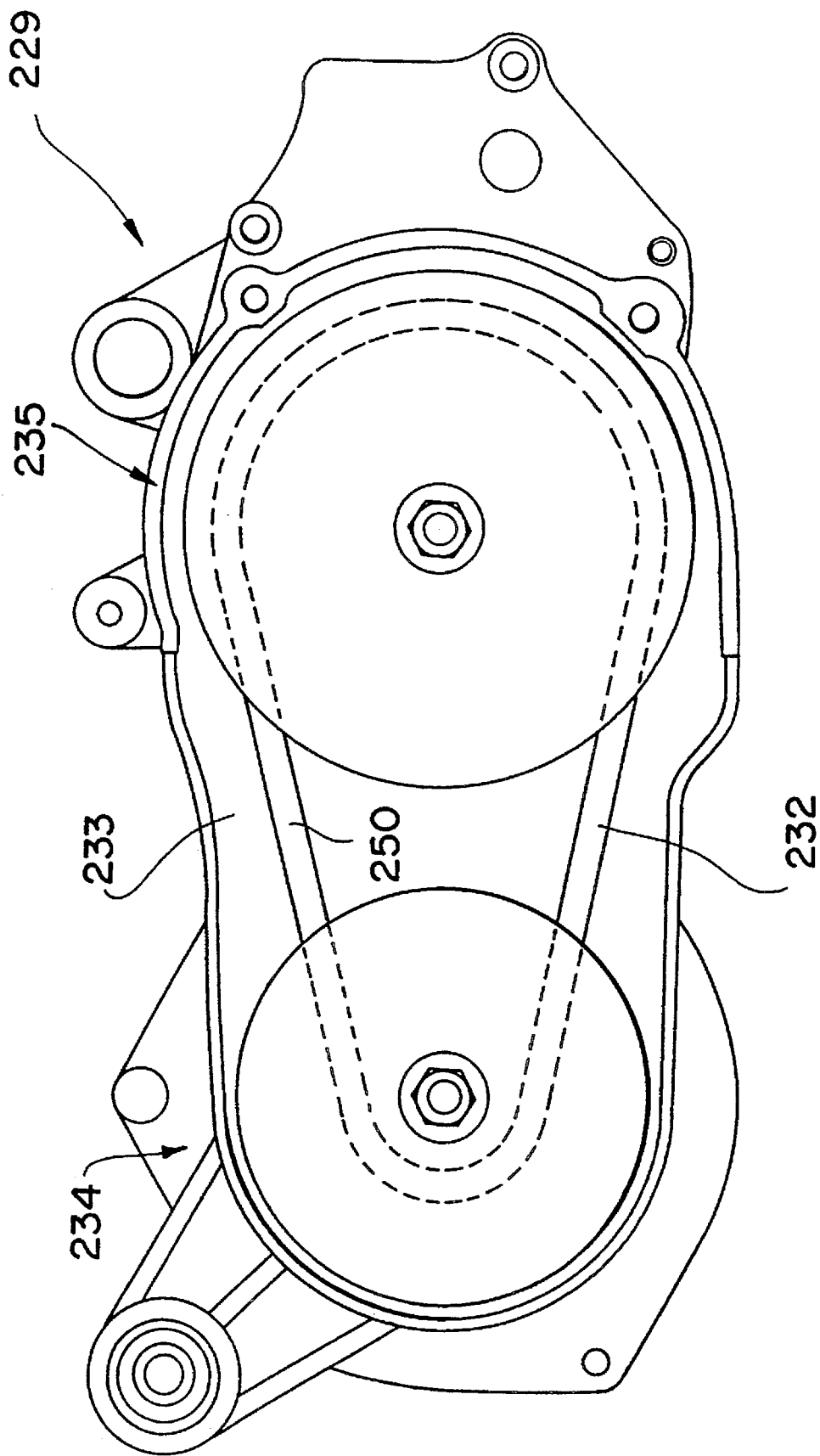
FIG. 12 is an enlarged side elevational view of an essential portion.
Figure 13:
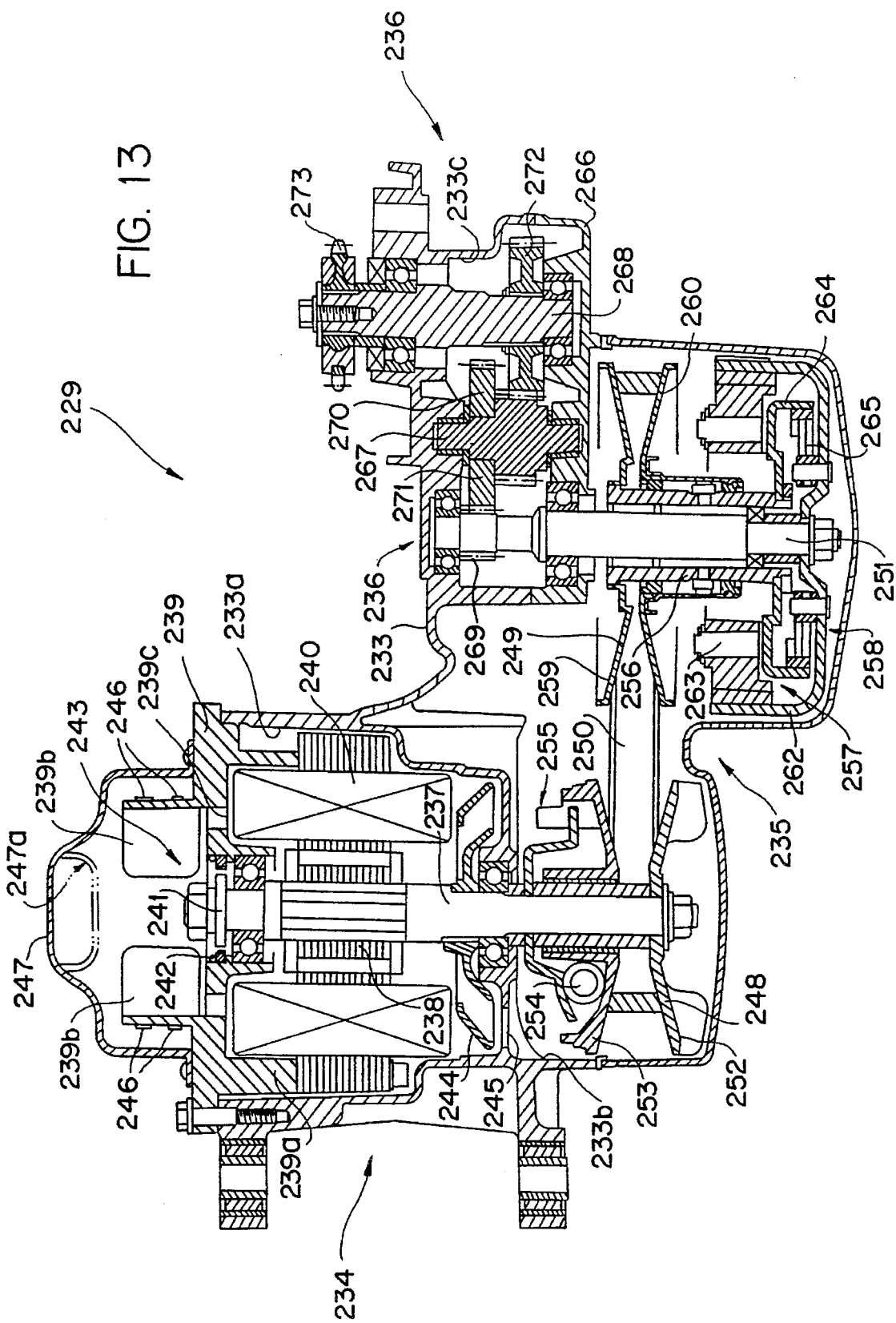
FIG. 13 is a sectional view of an essential portion.

FIGS. 11 to 13 illustrate a driving apparatus for an electrically operated two-wheeled vehicle according to an embodiment of the present invention. FIG. 11 is a side elevational view of the entire electrically operated two-wheeled vehicle. FIG. 12 is an enlarged side elevational view of an essential portion. FIG. 13 is a sectional view of the essential portion illustrated in FIG. 12.

Referring to FIG. 11, body frame 211 includes a pair of left and right main frames 212, 212 mounted at front ends thereof on a head tube 213. The main frames 212, 212 are provided to extend obliquely rearwardly from the head tube 213. A cross member, not shown, is provided between the main frames 212, 212. A front wheel 214 is supported on the head tube 213 by way of a front fork 215 for permitting steering operation by means of a steering handle 216. A head lamp 217, a meter box 218, and a wind screen 219 are operatively connected to the head tube 213.

A box 220 is placed at an upper portion of the body frame 211. A seat frame 221 extends rearwardly below the box 220 while a pivot shaft 222 is provided at rear portions of the main frames 212,212. Though not shown, a controller is disposed in the box 220 and an article accommodating section for accommodating a tool and so forth therein is defined in the box 220. The controller is connected to an electric motor, which will be hereinafter described, a battery and so forth and controls the electric motor. A seat 223 is placed on the seat frame 221. A swing arm 224 is supported for rocking motion on the pivot shaft 222. It is to be noted that, while the controller in the present embodiment controls the electric motor so as to operate in a high efficiency. A control system is disclosed in detail in Japanese Patent Application No. 1-181496 which was filed prior to the present invention. Thus, a full description is not presented herewith.

Figure 15:
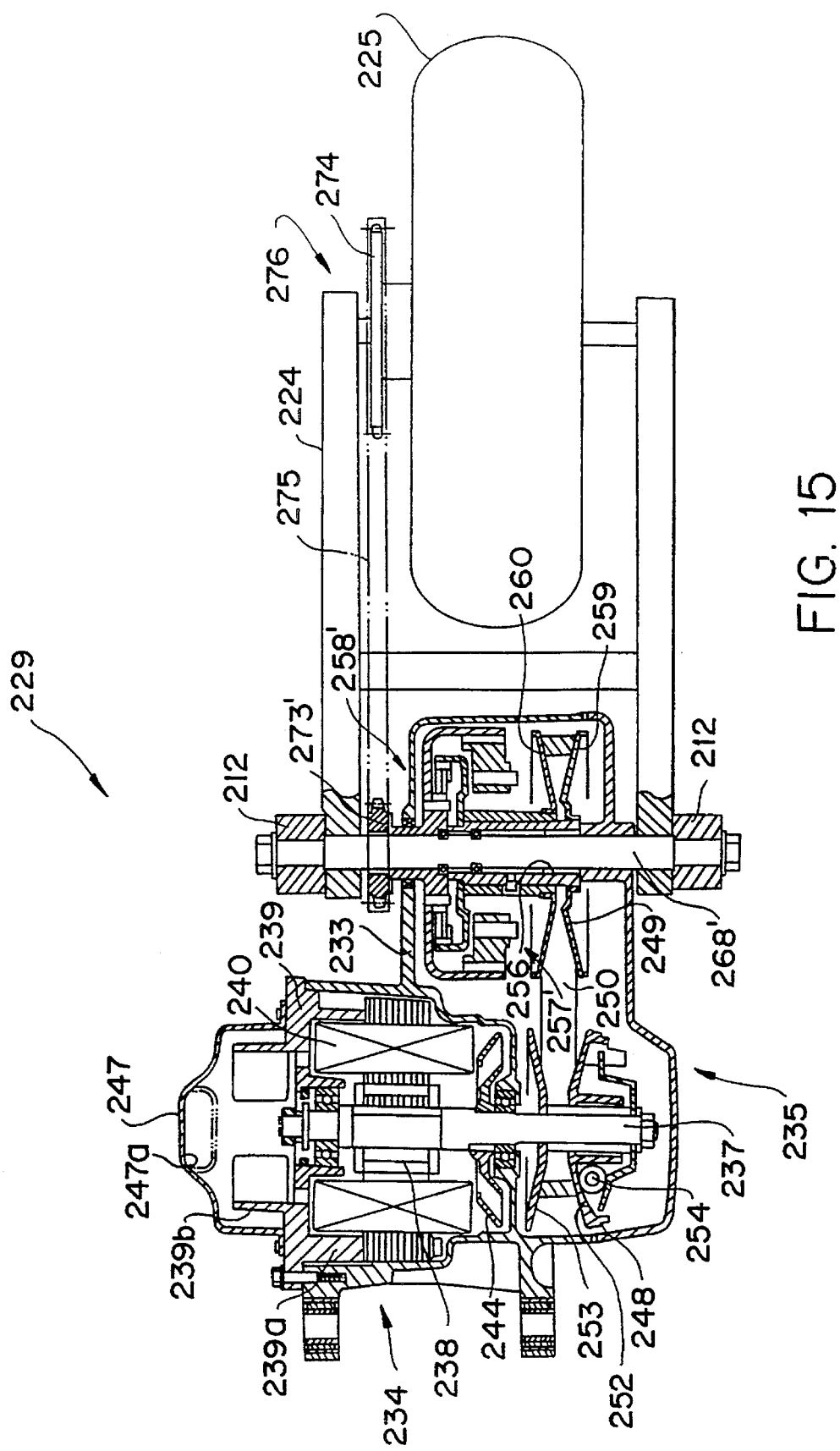
FIG. 15 is a sectional view of an essential portion.
Figure 16:
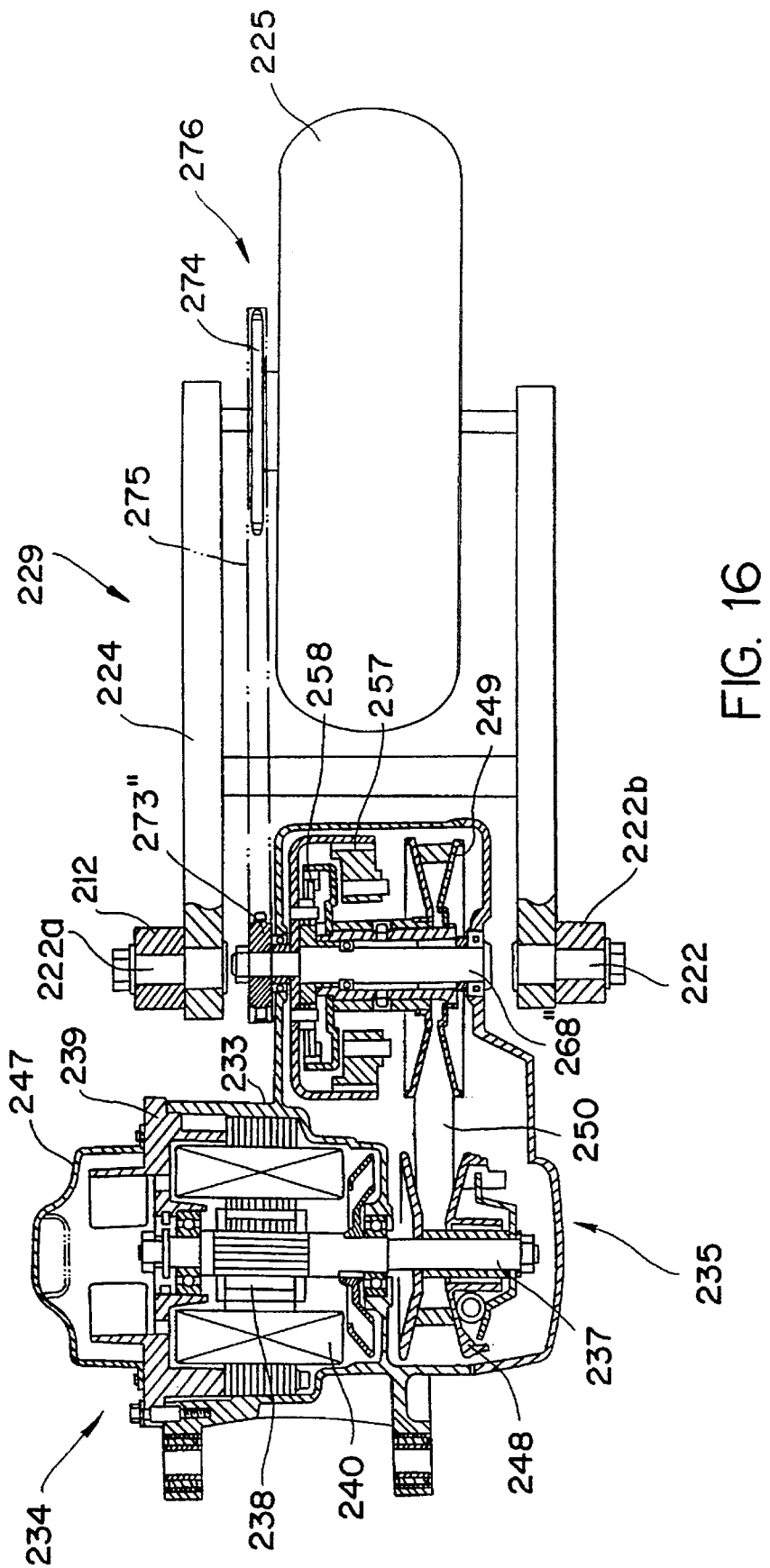
FIG. 16 is a sectional view of an essential portion of a driving apparatus for an electrically operated two-wheeled vehicle according to a further embodiment of the present invention.

The swing arm 224 is mounted at a front end thereof for pivotal motion on the pivot shaft 222. A rear wheel, driving wheel, 225 is supported at a rear end of the swing arm 224. Though not shown in FIG. 11, the swing arm 224 has a substantially ladder-like configuration in plan and supports the rear wheel 225 in a bilateral fashion thereon, as illustrated in FIGS. 15 and 16. The rear wheel 225 is connected to a power unit which will be hereinafter described by way of a wrapping connector 276, as illustrated in FIGS. 15 and 16, such that power may be transmitted to the rear wheel 225. The wrapping connector 276 includes a driven sprocket wheel 274 mounted on a hub or the like of the rear wheel 225. A chain, endless transmitting members, 275 is stretched between the driven sprocket wheel and a driving sprocket wheel of the power unit to transmit power. A cushion unit 226, a progressive link mechanism 227 and a pillion step 228 are operatively mounted to the rear of the vehicle.

A power unit 229 is suspended at a lower portion of the main frame 211. A battery 230 is carried below the power unit 229 by means of a battery frame 280. A cover member 231 which covers a front portion and lower portion of the power unit 229 and the battery 230 is hung on the main frame 211. The cover member 231 has a substantially L-shaped profile as viewed in side elevation and is mounted at a front upper end thereof on the main frame 211 and at a rear lower end thereof on the battery frame 280. A large number of air introducing holes 281 are formed in a front face of the cover member 231 in an opposing relationship to the power unit 229 so that a driving wind may collide with the power unit 229 by way of the wind introducing holes 281. The battery frame 280 has a substantially cage-like configuration and is suspended at a lower portion of the power unit 229. A plurality of batteries 230, connected in parallel or in series to each other, are placed on the battery frame 280. The batteries 230 are connected to the controller and an electric motor of the power unit 229.

The power unit 229 is constructed such that, as shown in FIG. 13, a housing 233 is mounted at front and rear portions thereof on the main frame 211 and an electric motor 234 is assembled in a recessed portion 233a formed on the front right side of the housing 233. A non-stage transmission 235 of the belt type is assembled in another recessed portion 233b formed on the front left side of the housing 233. A reducing gear mechanism 236 is assembled in a further recessed portion 233c formed on the rear left side of the housing 233. The electric motors 234, non-stage transmission 235 and reducing gear mechanism 236 are formed in an integral relationship with each other. Referring to FIG. 12, the power unit 229 is mounted such that a straight line interconnecting a rotary shaft of the electric motor 234 and an output power shaft of the reducing gear mechanism extend substantially in parallel to the main frame 211 in side elevation, that is, the line may be inclined rearwardly downwards.

The electric motor 234 includes a permanent magnet 238 constituting a rotor mounted on a rotary shaft 237 which extends through a bottom portion of the recessed portion 233a into the recessed portion 233b while coils 240 constituting a stator are mounted on a stator member 239 which closes an opening of the recessed portion 233a. The rotary shaft 237 is supported for rotation on the bottom portion of the recessed portion 233a and the stator member 239. A driving pulley which will be hereinafter described is mounted at a left end of the rotary shaft 237 in the recessed portion 233b. A fan 244 is mounted on the rotary shaft 237 adjacent to the bottom portion of the recessed portion 233a. A magnet 241 having a plurality of magnetic poles for the detection of rotation is securely mounted at a right end of the rotary shaft 237. The fan 244 is located in an opposing relationship to a vent hole 245 formed in the recessed portion 233a and is rotated together with the rotary shaft 237 to direct air from the recessed portion 233a toward the recessed portion 233b. The magnet 241 is provided in an opposing relationship to a magnetic sensitive element 242 such as an MR element provided on the stator member 239 to provide a rotation sensor 243. The rotation sensor 243 detects rotation of the rotary shaft 237 and outputs a detection signal to the controller.

A cylindrical portion 239a holding the aforementioned coils 240 thereon is formed on an inner face of the stator member 239 on the recessed portion 233a side. A heat sink 239b for the radiation of heat is formed on an outer face of the stator member 239. Vent holes 239c for the ventilation of a cooling air are formed at locations on the stator member 239 substantially the same as fins of the heat sink 239b. A plurality of switching elements 246 such as FETs providing a driving circuit for the electric motor 234 are mounted on the heat sink 239b. The switching elements 246 are connected to the aforementioned controller together with the coil 240. The switching elements 246 energize the coils 240 with a pulse current of a duty factor corresponding to a PWM signal inputted from the controller.

A cover 247 is mounted on the outer face of the stator member 239 and covers the heat sink 239. A hole 247a for the admission of a cooling air is formed in the cover 247. While detailed description is omitted herein, a cooling air is admitted through the hole 247a by rotation of the aforementioned fan 244. The cooling wind flows through the vent holes 239c, 245 and so forth to cool the electric motor 234 and the non-stage transmission 235.

The non-stage transmission 235 includes a belt 250 stretched between a driving pulley 248 and a driven pulley 249. The driving pulley 248 is provided on the rotary shaft 237 of the electric motor 234. The driven pulley 249 is provided on an input shaft 251 of the reducing gear mechanism 236. The driving pulley 248 has a fixed face 252 mounted on the rotary shaft 237 and a movable face 253 supported for axial movement on the rotary shaft 237. The movable face 253 is driven by a governor mechanism 255 having a weight 254 thereon to move in an axial direction. In the driving pulley 248, the weight 254 is moved in a diametrical direction by a centrifugal force in response to the speed of rotation of the rotary shaft 237 so that the wrapping diameter of the belt 250 is varied.

The driven pulley 249 is provided on a sleeve 256 fitted for rotation on an outer periphery of the input shaft 251 and is connected to the input shaft 251 by way of a parallel arrangement of a first centrifugal clutch 257 and a second centrifugal clutch 258. The driven pulley 249 has a fixed face 259 mounted on a right end of the sleeve 256. A movable face 260 supported for axial movement on the sleeve 256 and a spring, not shown, for urging the movable face 260 toward the fixed face 259 side. The movable face 260 is moved in an axial direction in response to a variation in the wrapping diameter of the driving pulley 248 so that the belt wrapping diameter is varied.

The first centrifugal clutch 257 includes a clutch outer member 262 mounted at a left end of the sleeve 256 while a clutch inner member 263 is provided on a clutch outer member 264 of the second centrifugal clutch 258 so that the first centrifugal clutch 257 is engaged or disengaged in response to a speed of rotation of the clutch outer member 264 of the second centrifugal clutch 258. The second centrifugal clutch 258 includes the clutch outer member 264 secured to the input shaft 251 while a clutch inner member 265 is provided on the clutch outer member 262 of the first centrifugal clutch 257 so that the second centrifugal clutch 258 is engaged or disengaged in response to a speed of rotation of the first centrifugal clutch 257.

The reducing gear mechanism 236 includes the input shaft 251 extending through a lid member 266 which closes an opening of the recessed portion 233c and is supported for rotation on the lid member 266 and a bottom portion of the recessed portion 233c. An intermediate shaft 267 and an output power shaft 268 are supported on the bottom portion of the recessed portion 233c and the lid member 266. A gear 269 is securely mounted on the input shaft 251 and large and small gears 270 and 271 are mounted on the intermediate shaft 267 while a further gear 272 is mounted on the output power shaft 268. The gear 269 is held in meshing engagement with the gear 270 while the gear 271 is held in meshing engagement with the gear 272. The output power shaft 268 extends rightwardly through and from the housing 233. A driving sprocket wheel 273 is mounted on an outwardly extending end of the output power shaft 268. As described hereinabove, the chain is stretched between the driving sprocket wheel 273 and the driven sprocket wheel of the rear wheel 225 so that the driving sprocket wheel 273 is connected to the rear wheel 225 so that power may be transmitted to the latter. The reducing gear mechanism 236 reduces the speed of output power of the electric motor 234 transmitted thereto by way of the non-stage transmission 235 and transmits the power of the reduced speed to the wrapping connector 276, that is, to the rear wheel 225.

In the driving apparatus for an electrically operated two-wheeled vehicle, the electric motor 234 is energized with a pulse current of a duty factor corresponding to an amount of operation of an accelerator grip or the like. Power outputted from the electric motor 234 is changed in speed by the non-stage transmission 235 and transmitted to the rear wheel 225 by way of the reducing gear mechanism 236 and the wrapping connector 276. Here, the non-stage transmission 235 changes the speed in response to a speed of rotation of the rotary shaft 237 of the electric motor 234 to cause the electric motor 234 to operate in a high efficiency. Accordingly, saving of the power consumption can be achieved. It is to be noted that the construction and control for the achievement of the operation of the electric motor 234 in a high efficiency is disclosed in Japanese Patent Application No. 1-181496 and Japanese Utility Model Application No. 2-51139 filed prior to the present application and incorporated herein by reference.

Meanwhile, in the driving apparatus, the electric motor 234, non-stage transmission 235 and reducing gear mechanism 236 are assembled integrally to each other as the power unit 229. The power unit 229 is carried at a lower portion of the body frame 211 to form a straight line interconnecting the rotary shaft 237 of the electric motor 234. The output power shaft 268 of the reducing gear mechanism 236 may be positioned substantially in parallel to the main frames 212 as viewed in side elevation. Accordingly, even the power unit 229 having a large size can be disposed effectively making use of a dead spacing below the main frame 211 and without occupying a large spacing. In addition, the layout of the mechanism is facilitated. Particularly since the power unit 229 of the present driving apparatus is carried with the electric motor 234 positioned forwardly, a driving air can collide with the electric motor 234 to effectively cool the electric motor 234.

Further, in the present electrically operated two-wheeled vehicle, the power unit 229 having a great weight is disposed at a lower portion of the main frame 211 while the batteries 230, which are also a heavy weight, are disposed below the power unit 229. Accordingly, a location of the center of gravity at a lower position can be achieved and a high degree of driving stability can be obtained.

Figure 14:
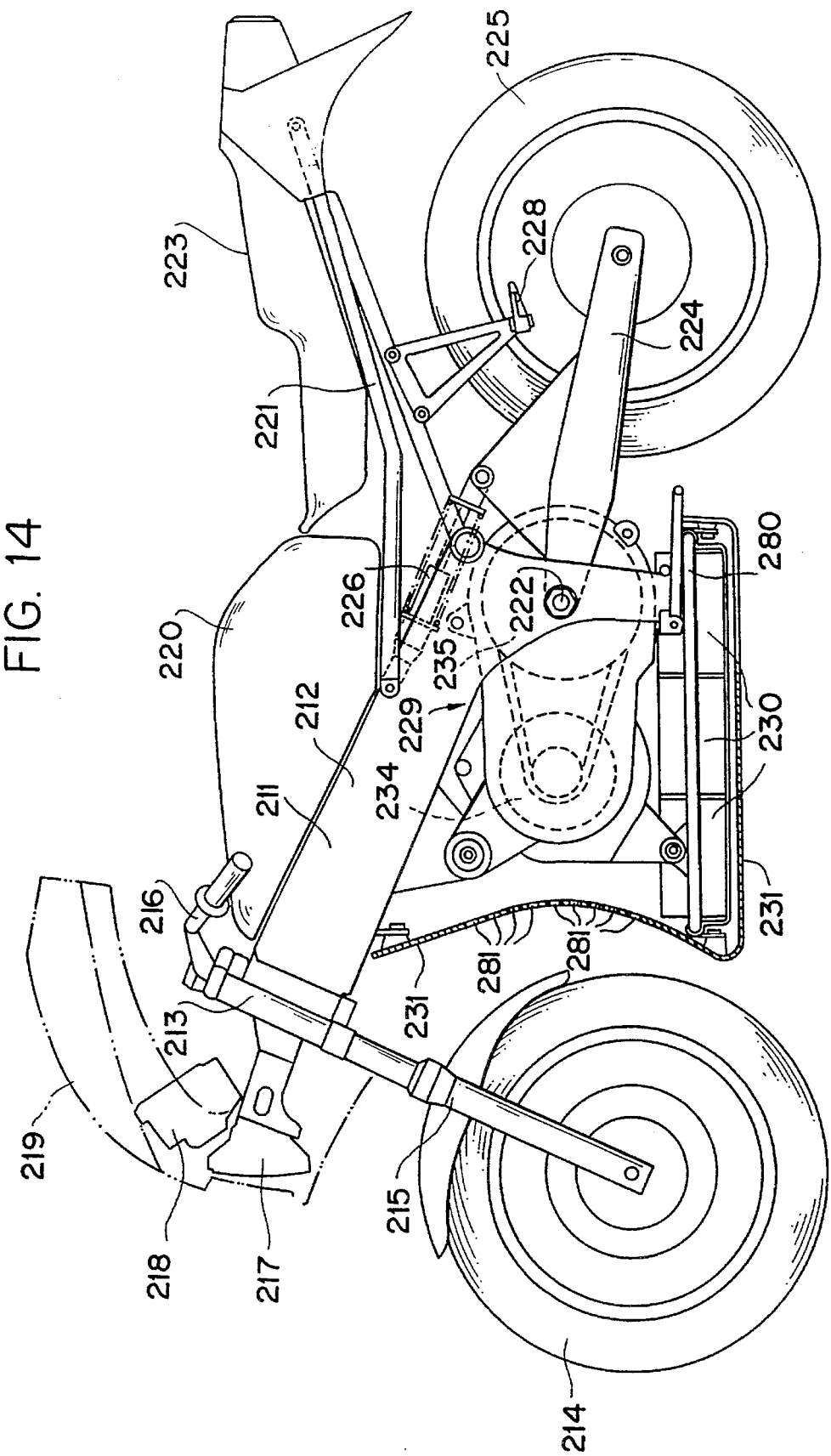
FIG. 14 is a side elevational view of an electrically operated two-wheeled vehicle according to another embodiment.

A driving apparatus for an electrically operated two-wheeled vehicle according to another embodiment of the present invention is shown in FIGS. 14 and 15. FIG. 14 is a side elevational view of a two-wheeled vehicle. FIG. 15 is a sectional view of an essential portion.

It is to be noted that, in the description of the present embodiment and a further embodiment which will be hereinafter described, like reference numerals are applied to like portions to those of the embodiment described above and description thereof will be omitted herein.

As shown in FIG. 15, in the present embodiment, a power unit 229 includes an electric motor 234 and a non-stage transmission 235. The power unit 229 is connected to a pivot shaft 222 extending for rotation through a rear portion of a housing 233 such that the rear portion of the housing 233 is supported on the pivot shaft 233. An output power shaft 268 is formed from a cylindrical member fitted for rotation on an outer periphery of the pivot shaft 222 and coaxial with the pivot shaft 222. The output power shaft 268 extends at a right end thereof to the right from the housing 233. A driven pulley 249 of the non-stage transmission 235 is provided on the output power shaft 268 in the housing 233 by way of a sleeve 256 while a driving sprocket wheel 273 is mounted at the right end of the output power shaft 268' which extends outwardly from the housing 233. Similarly, as in the embodiment described above, the driven pulley 249 is connected to the output power shaft 268' by way of a first centrifugal clutch 257' and a second centrifugal clutch 258'.

Also in the present embodiment, the power unit 229 is carried such that the electric motor 234 is located forwardly and a straight line interconnecting a rotary shaft 237 of the electric motor 234 and the output power shaft 268' may be substantially horizontal as viewed in side elevation. In other words, substantially in parallel to the main frames 212 and the power unit 229. Batteries 230 are disposed below the body frame 211. Accordingly, the layout of the power unit 229 is easy and the electric motor 234 can be cooled effectively. In addition, the location of the center of gravity at a low position can be achieved.

In the present embodiment, the driving sprocket wheel 273' is securely mounted on the output power shaft 268' coaxial with the pivot shaft 222. A chain 275 is stretched between the driving sprocket wheel 273' and a driven sprocket wheel 274 of a rear wheel 225. Accordingly, even when bounding or rebounding takes place with the rear wheel 225, the distance between the driving sprocket wheel 273' and the driven sprocket wheel 274 is not varied. Variation in tensile force of the chain 275 can be prevented.

FIG. 16 shows a further embodiment of the present invention. A pivot shaft 222" includes two shafts 222a and 222*b* and an output power shaft 268" of a power unit 229 is disposed between the shafts 222*a* and 222*b*. The pivot shaft 222" including the shafts 222*a* and 222*b* are disposed in a coaxial relationship with each other. Left and right front portions of a swing arm 224 are supported on a main frame 211 by means of the shafts 222*a* and 222*b*. The power unit 229 including the output power shaft 268 is supported on a housing 233 in a coaxial relationship with the shafts 222*a* and 222*b* of the pivot shaft 222" between the shafts 222*a* and 222*b*. A driving sprocket wheel 273" is mounted at a right end portion of the output power shaft 268" which projects from the housing 233. It is to be noted that the remaining construction is similar to the embodiment shown in FIGS. 14 and 15.

Also with the embodiment illustrated in FIG. 16, the layout is easy and similar to the embodiments described hereinabove. Cooling of the electric motor 234 can be performed effectively with a driving wind. Further, the location of the center of gravity at a low position of the vehicle body can be achieved. Variations in tensile force of the chain 275 upon bounding or rebounding of the rear wheel 225 can be prevented.

As described so far, according to a driving apparatus for an electrically operated two-wheeled vehicle according to the present invention, since an electric motor and a non-stage transmission are assembled integrally with each other as a power unit and the power unit is carried at a lower portion of a body frame such that a straight line interconnecting a rotary shaft of the electric motor and an output power shaft may be substantially in parallel to a main frame, a dead space below the body frame can be utilized effectively. The layout of the power unit is easy. Also, a location of the center of gravity at a lower position can be achieved.

In the driving apparatus for an electrically operated two-wheeled vehicle of the present invention where the output power shaft of the power unit is disposed in a coaxial relationship to a pivot shaft and a driving wheel of a rapping connector is provided on the output power shaft, also variation in tensile force of an endless transmitting member such as a chain caused by bounding or rebounding of the driving wheel can be prevented.

Further, in the driving apparatus for an electrically operated two-wheeled vehicle of the present invention, where the power unit is carried with the electric motor located forwardly, the electric motor can be cooled effectively by a driving wind.

Figure 17:
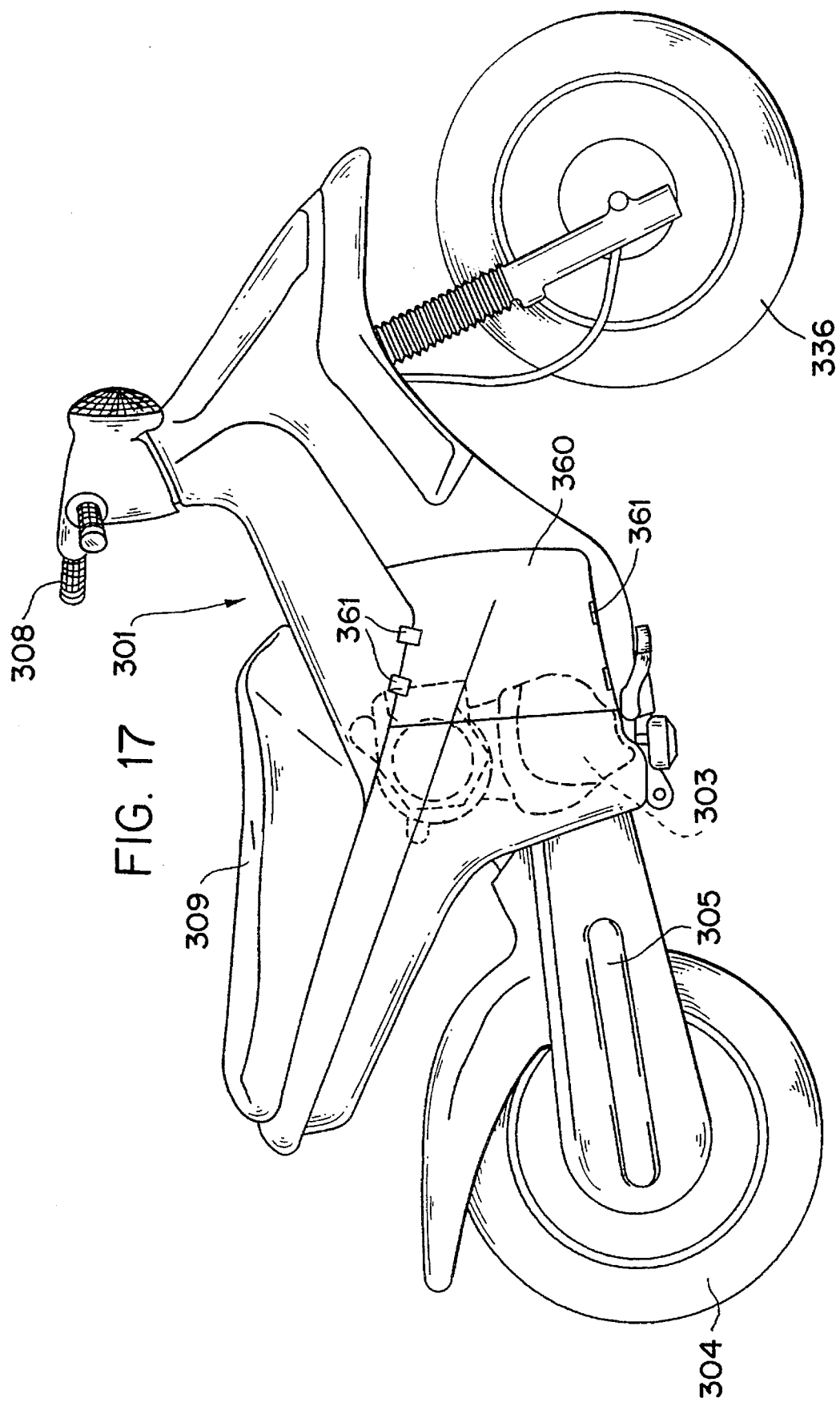
FIG. 17 is a side elevational view of a motorcycle according to another embodiment of the present invention.
Figure 18:
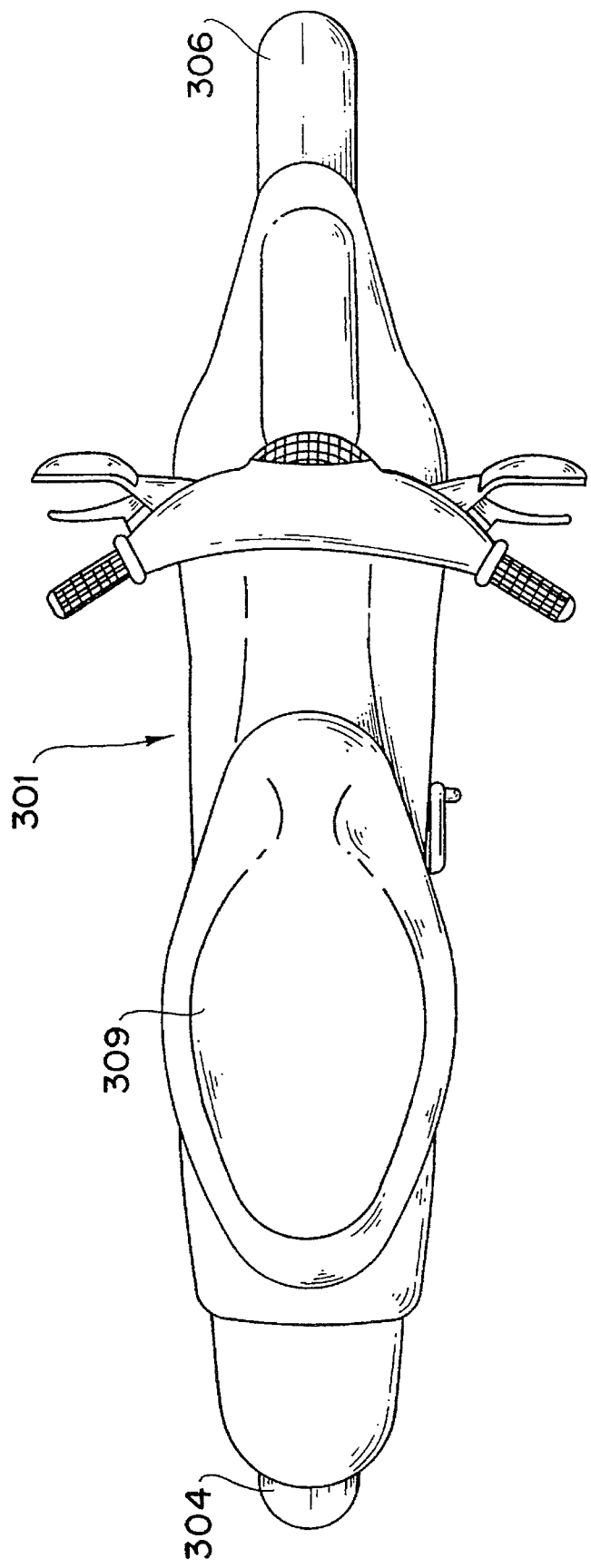
FIG. 18 is a plane view of the motorcycle illustrated in FIG. 17.
Figure 19:
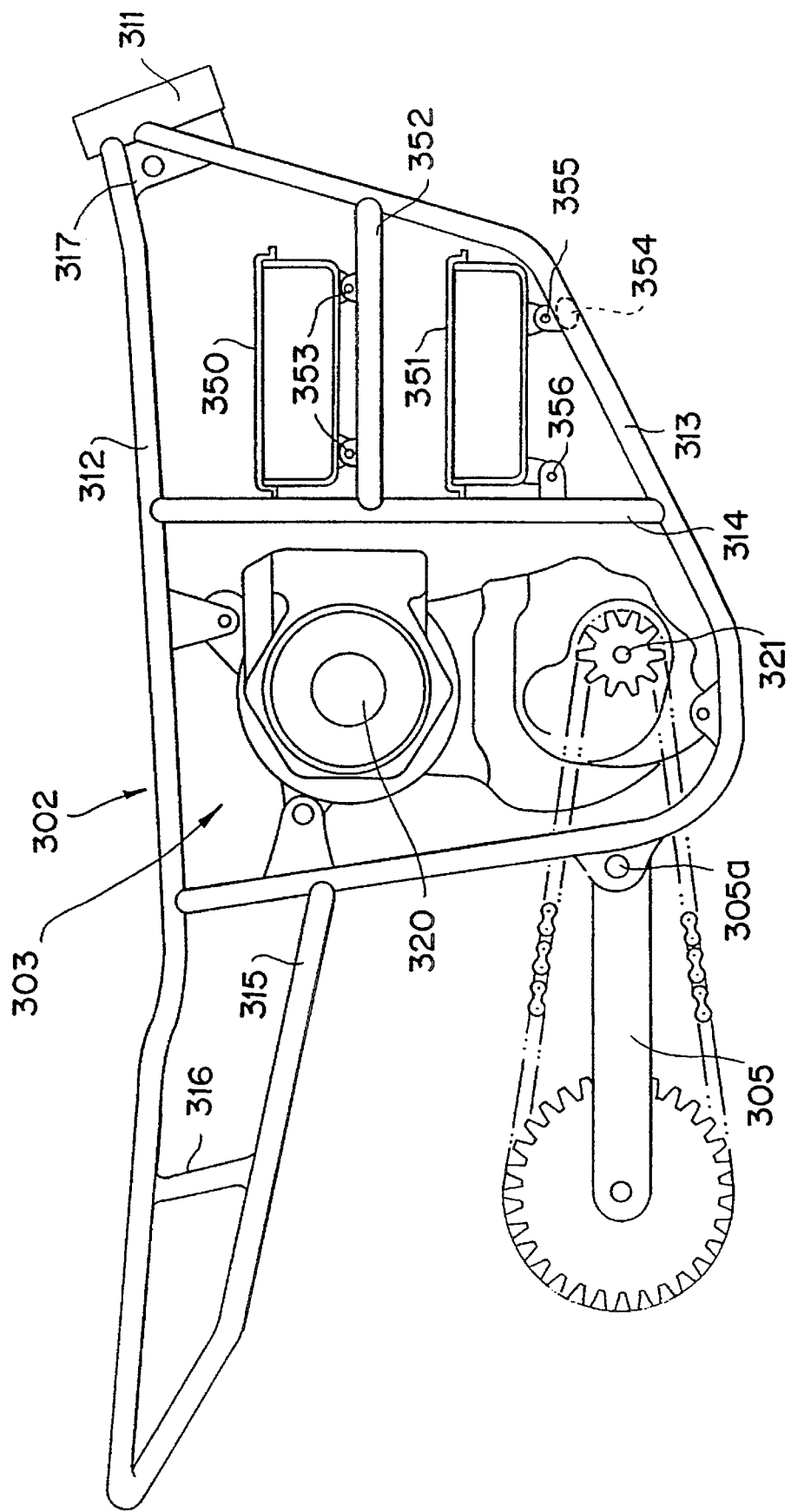
FIG. 19 is a side elevational view of a body frame as well as a power apparatus and a battery carried on the body frame.
Figure 20:
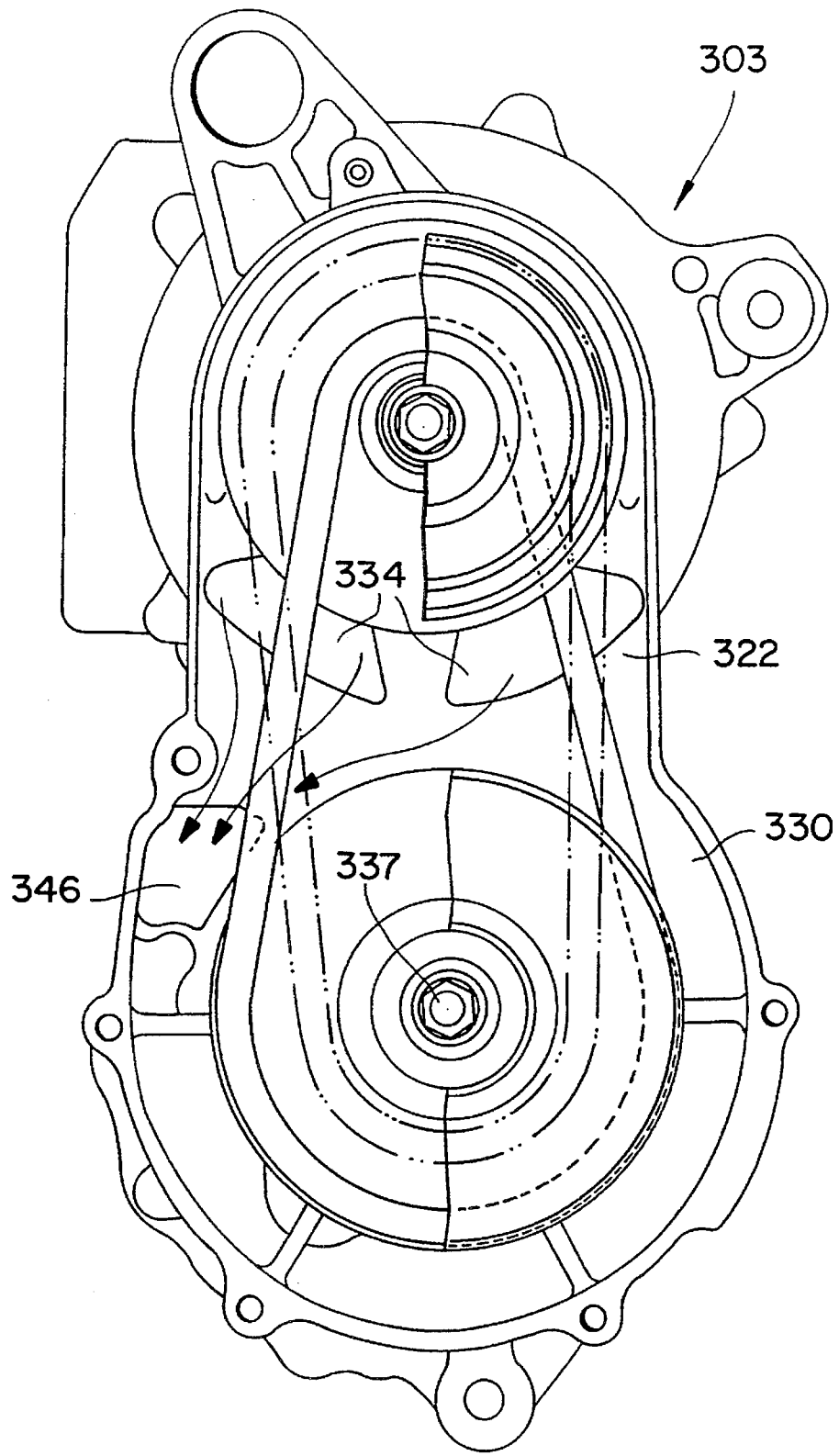
FIG. 20 is a left-hand side elevational sectional view of the power apparatus shown in FIG. 19.

FIG. 17 is a side elevational view of a motorcycle to which another embodiment of the present invention is applied. FIG. 18 is a plan view thereof. In FIGS. 17, 18 and 19, a body 301 is made of a constructional resin and covers a body frame 302 which will be hereinafter described. A power apparatus 303 is supported substantially at the center of the body frame 302. A rear wheel 304 is supported for rotation at a rear end of a rear fork 305 which is supported for rocking motion on the body frame 302 by way of a pivot shaft 305*a*. A front wheel 306 is supported for rotation on a front fork 307 which extends obliquely forwardly downwardly from a front end of the body frame 301. A handle 308 is provided for steering the front wheel 306. A seat 309 is mounted adjacent to the handle 308. It is to be noted that the rear fork 305 is held by a rear suspension, not shown, such that it may be positioned at a suitable angle.

The body frame 302 includes, as shown in FIG. 19, a head pipe 311. Left and right upper pipes 312 extend rearwardly substantially in a horizontal direction from an upper portion of the head pipe 311 to a rear portion of the seat. Left and right down pipes 313 extend obliquely downwardly from an upper portion of the head pipe 311 and further extend rearwardly at an angle near to a horizontal direction by way of an intermediate bent portion. The left and right down pipes 313 are then bent to rise upwardly. Cross pipes 314 are connected to substantially mid-portions of the upper pipes 312 and extend in an upward and downward direction between the down pipes 313 and the upper pipes 312. Left and right stay pipes 315 extend between the rising portions of the down pipes 313 and rear ends of the upper pipes 312. Cross pipes 316 extend between the stay pipes 315 and the upper pipes. Further, a gusset plate 317 for the reinforcement is welded to each of connecting portions of the head pipe 311, to the upper pipes 312 and the down pipes 313.

Figure 22:
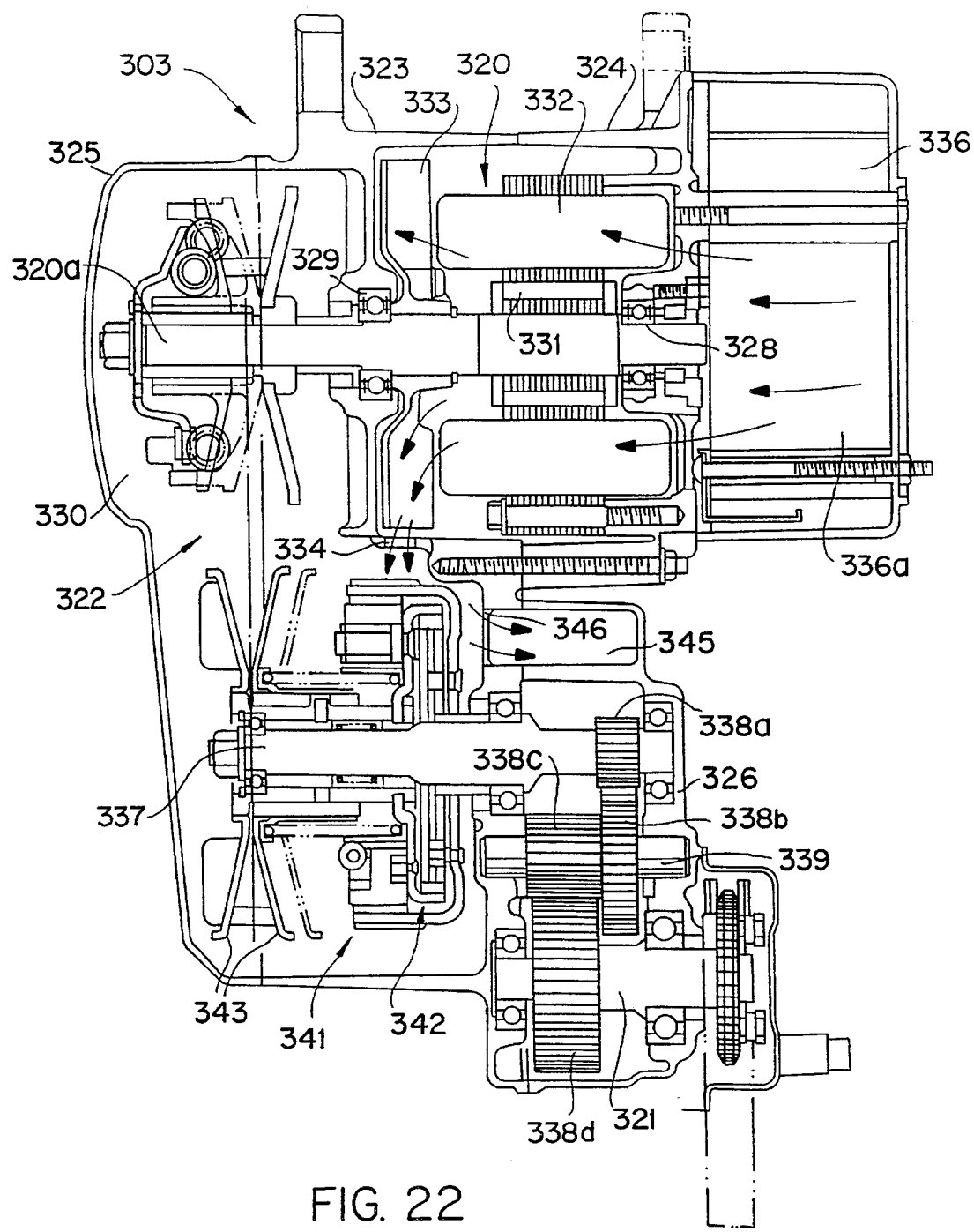
FIG. 22 is a sectional view of the power apparatus.
Figure 23:
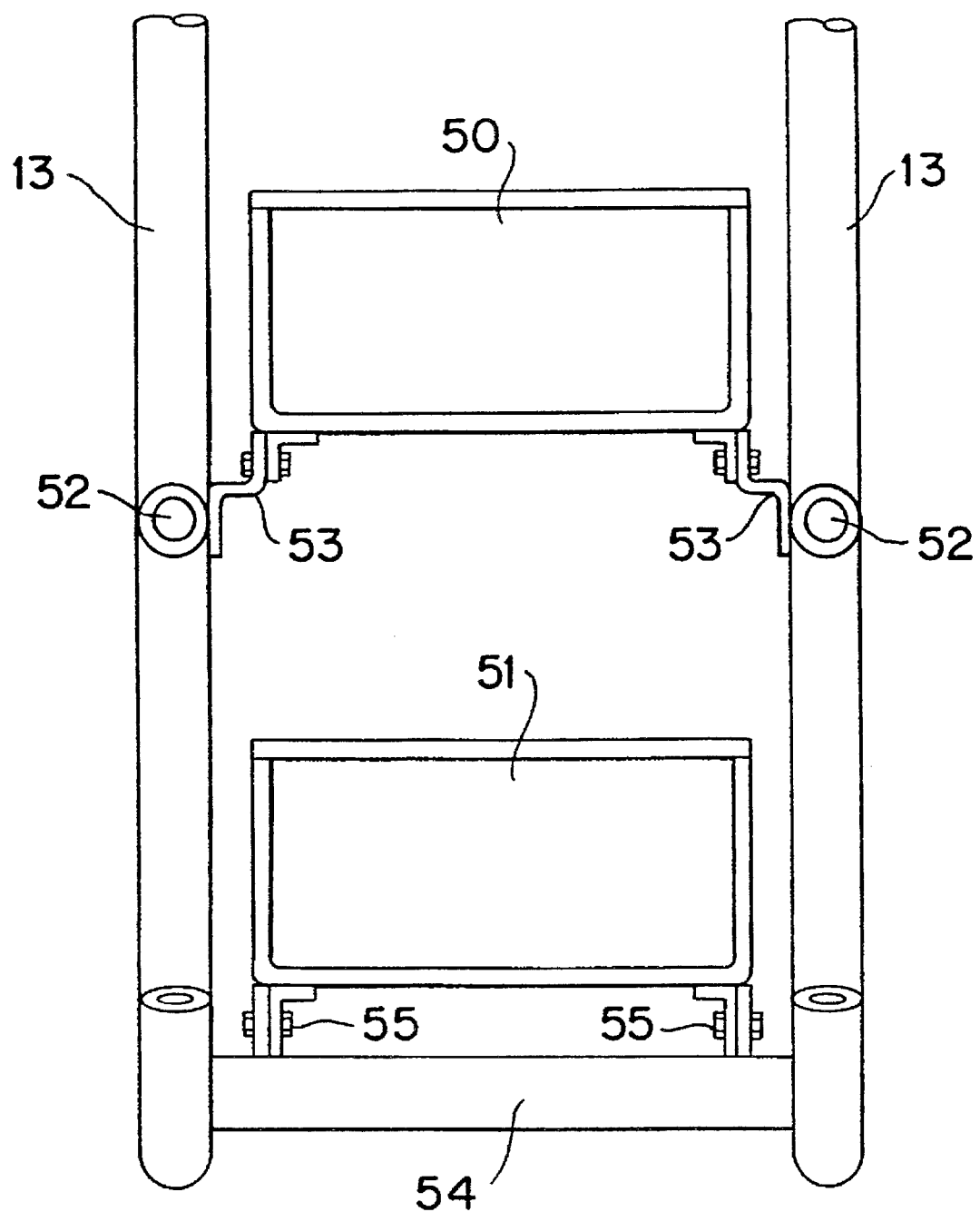
FIG. 23 is a front elevational view of the body frame.

The power apparatus 303 includes an electric motor 320 provided on the upper side while an output power shaft 321 is disposed on the lower side. A transmission 322 is interposed between the electric motor 320 and the output power shaft 321. As shown in FIG. 22, a casing which covers the power apparatus 303 includes a pair of left and right casing bodies 323 and 324. A casing cover 325 and a transmission cover 326 are fitted on the left side casing body 323.

A driving shaft 320*a* of the electric motor 320 is supported for rotation by means of ball bearings 328 and 329 mounted on the left and right casing bodies 323 and 324. An end portion of the driving shaft 320*a* extends through the left side casing body 323 into a transmission chamber 330. A rotor magnet 331 is mounted on an outer periphery of the driving shaft 320*a*. Stator coils 332 are disposed outwardly of the rotor magnet 331 and supported on the right side casing body 324. A cooling fan 333 for cooling the electric motor 320 is mounted on the outer periphery of the driving shaft 320*a* leftwardly of the rotor magnet 331. Warm air, after cooling which flows outwardly in a diametrical direction, impelled by the cooling fan 333, flows into the transmission chamber 330 by way of a hole 334 formed in the left side casing body 323.

A drive unit 336, for controlling the electric motor, is mounted on the right side casing body 324 which is positioned on the left side of the electric motor 320 by means of bolts. The center of the drive unit 336 is formed as a hollow portion 336*a*. The hollow portion 336*a* is utilized as a passageway through which a cooling water is admitted into the casing when the cooling fan 333 is driven.

The transmission 322, which makes use of known V belt, is connected to the driving shaft 320*a* of the electric motor. A transmission output power shaft 337, which is an output power shaft of the transmission 322, is transmitted to the output power shaft 321 by way of transmission gears 338*a* to 338*d* and a counter shaft 339.

A first clutch 341 is provided for the transmission of power from the electric motor 320 to the output power shaft 321 side in a so-called forward direction. A second clutch 342 is provided for the transmission of power reversely from the output power shaft 321 to the electric motor 320 side. Both the first clutch 341 and the second clutch 342 are provided on the transmission output power shaft 337. In particular, the first clutch 341 effects transmission of power to the output power shaft 321 side only when rotation of a driven pulley 343 and so forth exceeds a predetermined rotational speed, for example, 1,200 rpm. On the contrary, the second clutch 342 effects transmission of power when rotation of the transmission output power shaft 337 exceeds another rotational speed, for example, 700 rpm. The second clutch 342 is provided mainly to apply engine brake.

Figure 21:
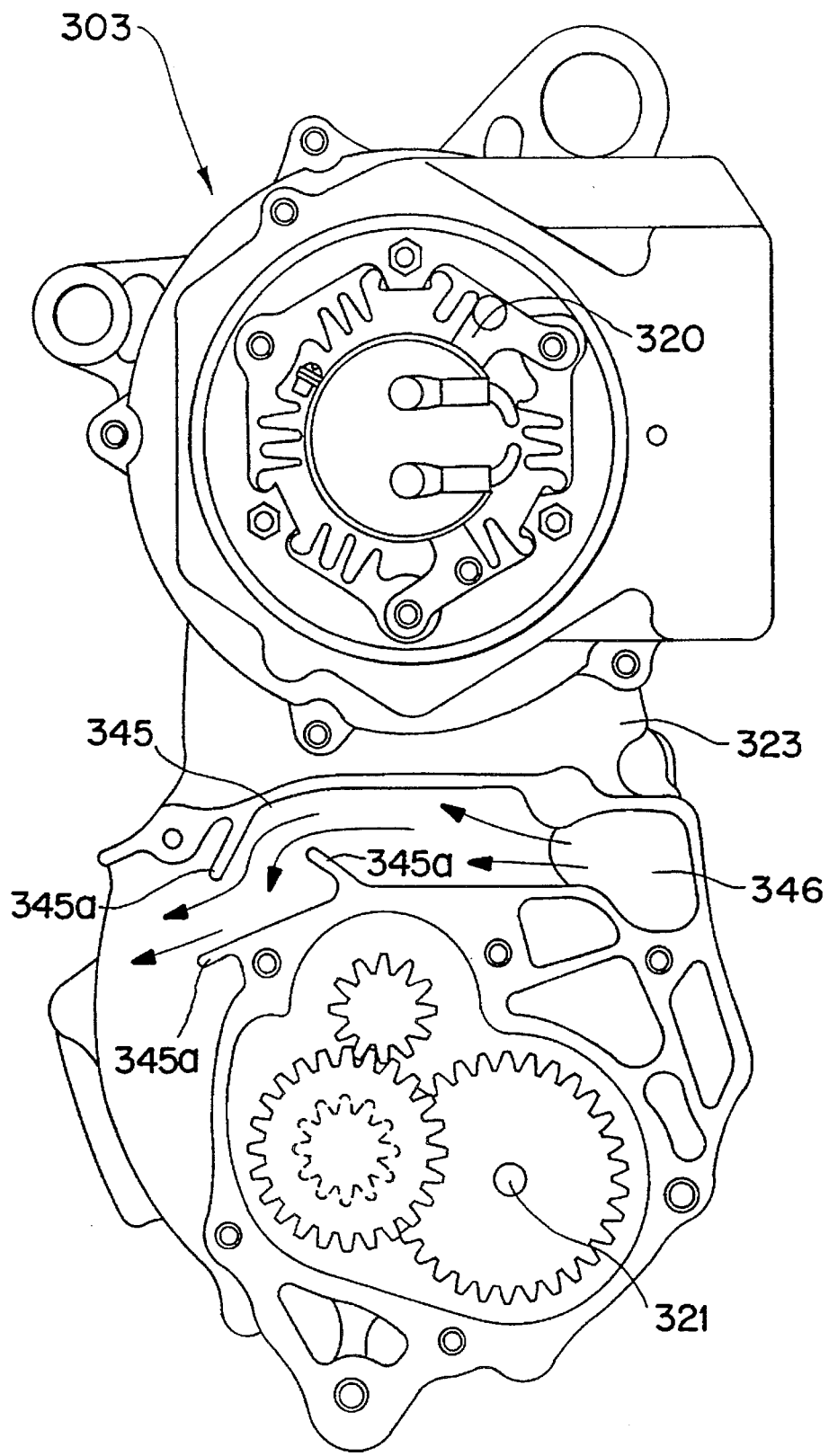
FIG. 21 is a right-hand side elevational sectional view of the power apparatus shown in FIG. 19.

As shown in FIG. 21, a passageway 345 for the discharging of a cooling air which extends in the casing from the front side of the body to the rear of the body is formed between the left side casing body 323 and the transmission casing. The passageway 345 is communicated with the transmission chamber 330 by way of a hole 346 formed in the left side casing body 323. Further, baffle plates 345a are formed to extend from a peripheral wall of the passageway 345 so that mud or rainwater may not be admitted in through the passageway 345.

As illustrated in FIG. 19, forwardly of the power apparatus 303, two upwardly and downwardly separated batteries 350 and 351 are disposed and supported on the body frame 302. In particular, the upper side battery 350 is mounted by way of brackets 353,353 on horizontal cross pipes 352 which extend between the down pipes 313 and the cross pipes 314. The lower battery 351 is mounted by way of brackets 355 and 356 on a cross pipe 354 extending between the left and right down pipes 313, 313 and the cross pipes 314. The two batteries 350 and 351 are set such that they may present a rectangular profile as viewed in plan such that the dimension in a leftward and rightward direction may be greater than the dimension in a forward and rearward direction. Attention is paid so that the power apparatus 303 at the rear location may be exposed to a driving air as much as possible.

In FIG. 17, a cover 60 is provided which is constructed of a resin material. A lower end of the cover 360 is hinge coupled so that it may be opened and closed. In a normal case, an upper end of the cover 360 is arrested by arresting portions or the like 361 making use of resiliency of the resin so that the cover 360 is held in a closed condition.

With the motorcycle of the construction described above, due to the fact that the electric motor 320 is located on the upper side of the output power shaft 321 or the transmission 322 and is thus located at a position spaced from the ground and that the lower side of the electric motor 320 is naturally covered with the output power shaft 321 and the transmission 322, dust, water or the like is not likely to be admitted directly into the electric motor from the ground. Further, the electric motor 320 disposed at an upper location of the body frame 302 can be removed or remounted readily only if the drive unit 336 is removed from side of the body, from the right in FIG. 22. The maintenance of the mechanism is highly facilitated.

In addition, since the cooling fan 333 is accommodated in the electric motor 320 and the motor 320 itself has a cooling function, even if it is disposed at a location rearwardly of the batteries 350 and 351 at which it is not exposed to very much to a driving air, the motor will not suffer from any trouble in properly functioning.

It is to be noted that, while in the embodiment described above the batteries have a structure wherein they are heated up at two upper and lower stages. The arrangement is not limited to this and the batteries may be provided at one upper side or lower side stage. In this instance, if the upper side battery 350 should be removed, an empty space formed therein may be utilized as a helmet box or may be utilized as a space in which a controller for the electric motor or a charger is to be disposed.

The electric motor is located on the upper side of the output power shaft and the transmission and located at a position spaced away from the ground. The lower side of the electric motor is covered by the output power shaft and the transmission. Thus, dust, water or the like is not liable to be directed into the electric motor.

Further, the electric motor disposed above the body frame can be removed or remounted readily from the side of the body independently of the output power shaft and the transmission. Also, improvement in the maintenance of the motor can be achieved.

The electric motor itself has a cooling function. Even if the motor is disposed at a location rearwardly of the battery where it is not exposed very much to a driving wind, there is no trouble in functioning. Thus, the degree of freedom in arrangement of the motor is increased.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:
1. An electrically operated saddle vehicle comprising:
a twin-tube vehicle frame;
at least one front wheel supported on a front wheel supporting member mounted adjacent to a front portion of said vehicle frame;
at least one rear wheel supported on a rear wheel supporting member mounted adjacent to a rear portion of said vehicle frame;
an electric motor supported on said vehicle frame between said front wheel and said rear wheel and including a front portion positioned adjacent to said front wheel;
transmission means operatively connected to said electric motor and at least one of said front and rear wheels for providing propulsion for said vehicle, the electric motor and transmission means being in linear alignment in the longitudinal direction of the vehicle with the electric motor being in front of the transmission means, the transmission means being mounted to the vehicle frame;
wherein air is directed to contact said electric motor while said vehicle is in motion for cooling said electric motor during use; and
at least one battery connected to said electric motor and being disposed in a frame mounted beneath said electric motor for lowering the center of gravity of said vehicle.

2. The electrically operated saddle vehicle according to claim 1, wherein said vehicle frame includes a pair of left and right main frame members extending rearwardly from said at least one front wheel, said transmission means being substantially aligned with said pair of left and right main frame members for providing a space between the transmission means and the pair of left and right main frame members.

3. The electrically operated saddle vehicle according to claim 1, and further including a pivot shaft positioned on said vehicle frame and a swing arm being secured to said pivot shaft and said rear wheel.

4. The electrically operated saddle vehicle according to claim 3, wherein both said pivot shaft and said transmission means have longitudinal axes, said pivot shaft is in a coaxial relationship relative to said transmission means.

5. The electrically operated saddle vehicle according to claim 1, wherein said electric motor and said transmission means are disposed directly adjacent to said front wheel for effectively cooling said electric motor and said transmission means by means of ambient air flowing thereover.

6. The electrically operated saddle vehicle according to claim 1, and further including a cover for said electric motor, a plurality of air vent holes being formed in said cover for permitting air to be in communication with said electric motor for cooling said electric motor.

7. The electrically operated saddle vehicle according to claim 1, and further including a fan means connected to said electric motor for cooling said electric motor as said electric motor is utilized.

8. The electrically operated saddle vehicle according to claim 1, and further including a radiator for said electric motor for supplying liquid coolant for cooling said electric motor and said transmission means.

9. The electrically operated saddle vehicle according to claim 8, and further including pump means for pumping liquid through said radiator and a jacket disposed adjacent to said electric motor for cooling said electric motor.

10. The electrically operated saddle vehicle according to claim 1, and further including a chain connected between said transmission means and said rear wheel for imparting rotation thereto.

11. The electrically operated saddle vehicle according to claim 1, and further including a chain connected between said electric motor and said rear wheel for imparting rotation thereto.

12. The electrically operated saddle vehicle according to claim 1, wherein said transmission is a non-stage transmission wherein the power changed in speed by said non-stage transmission is transmitted to the rear wheel by means of a wrapping connector for driving said rear wheel.

13. The electrically operated saddle vehicle according to claim 12, and further including a swing arm mounted for a rocking motion around a pivot shaft on said vehicle frame, wherein an output power shaft of said non-stage transmission and said pivot shaft are disposed in a coaxial relationship relative to each other.

14. An electrically operated saddle vehicle comprising:
a twin-tube vehicle frame;
at least one front wheel supported on a front wheel supporting member mounted adjacent to a front portion of said vehicle frame;
at least one rear wheel supported on a rear wheel supporting member mounted adjacent to a rear portion of said vehicle frame;
an electric motor supported on said vehicle frame between said front wheel and said rear wheel and including a front portion positioned adjacent to said front wheel;
transmission means operatively connected to said electric motor and at least one of said front and rear wheels for providing propulsion for said vehicle, the electric motor and transmission means being in linear alignment in the longitudinal direction of the vehicle with the electric motor being in front of the transmission means, the transmission means being mounted to the vehicle frame;
wherein air is directed to contact said electric motor while said vehicle is in motion for cooling said electric motor during use; and
a box supported at a front portion of said vehicle frame, said box including a cover mounted for opening and at least one battery being disposed within said box and connected to the electric motor.

15. The electrically operated saddle vehicle according to claim 14, wherein the at least one battery is located in the box below the electric motor and transmission means with the electric motor and transmission means being between the at least one battery and the twin-tube vehicle frame.

16. The electrically operated saddle vehicle according to claim 14, wherein the at least one battery in the box is between the twin tube vehicle frame and above the electric motor.

17. The electrically operated saddle vehicle according to claim 14, wherein the twin-tube vehicle frame includes a right main frame, a left main frame and a head tube mounting portion, the front wheel supporting member extending through the head tube mounting portion, the right and left main frames engaging the head tube mounting portion and extending rearwardly to the rear wheel supporting member, a space being defined between the right and left main frames between the head tube mounting portion and the rear wheel supporting member, the box with the at least one battery being located in the space between the right and left main frames.

18. The electrically operated saddle vehicle according to claim 17, wherein the box with the at least one battery is located above and forwardly of the electric motor.

19. An electrically operated saddle vehicle comprising:
a twin-tube vehicle frame;
at least one front wheel supported on a front wheel supporting member mounted adjacent to a front portion of said vehicle frame;
at least one rear wheel supported on a rear wheel supporting member mounted adjacent to a rear portion of said vehicle frame;
an electric motor supported on said vehicle frame between said front wheel and said rear wheel and including a front portion positioned adjacent to said front wheel;
transmission means operatively connected to said electric motor and at least one of said front and rear wheels for providing propulsion for said vehicle, the electric motor and transmission means being in alignment along the longitudinal direction of the vehicle with the electric motor being in front of the transmission means, the transmission means being mounted to the vehicle frame;
wherein air is directed to contact said electric motor while said vehicle is in motion for cooling said electric motor during use;
said transmission being a non-stage transmission wherein the power change in speed by said non-stage transmission is transmitted to the rear wheel by means of a wrapping connector for driving said rear wheel; and
a pivot shaft being positioned on said vehicle frame and the swing arm being secured to said pivot shaft and said rear wheel, the swing arm being mounted for a rocking motion around a pivot shaft on said vehicle frame, wherein an output power from said non-stage transmission and said pivot shaft are disposed in a coaxial relationship relative to each other.

20. The electrically operated saddle vehicle according to claim 19, further comprising a cover member and box, the box being mounted in the cover member beneath the electric motor, the cover member extending at least below the box and in front of the box and electric motor, the cover member having a plurality holes through which the air is directed to contact the electric motor while said vehicle is in motion, at least one battery being disposed within the box and being connected to the electric motor.

21. The electrically operated saddle vehicle according to claim 19, wherein the electric motor and the transmission means are linearly aligned and are generally parallel to a longitudinal axis of the vehicle, the longitudinal axis extending between the at least one front wheel and the at least one rear wheel.

22. The electrically operated saddle vehicle according to claim 19, further comprising a housing in which at least the electric motor is located, the housing having a cover on a side thereof with an opening being provided in the cover, a fan being provided within the housing on an opposite side to the side having the opening, the electric motor having coils which are positioned between the opening and the fan, operation of the fan will draw air into the housing to cool the electric motor, the electric motor being located in front of the non-stage transmission with a belt being provided between the electric motor and non-stage transmission, the fan being located between the belt and the coils of the electric motor.

23. The electrically operated saddle vehicle according to claim 19, further comprising a belt extending between the electric motor and the non-stage transmission, the electric motor having a driving pulley on a rotary shaft and the non-stage transmission having a driven pulley on an input shaft, the belt extending between the driving pulley and the driven pulley, the driving pulley having a fixed face and a movable face, the movable face being axially movable on the rotary shaft to vary distance between the movable face and the fixed face to thereby vary wrapping diameter of the belt.

24. The electrically operated saddle vehicle according to claim 23, wherein the driven pulley has a fixed face and movable face supported on the input shaft, the movable face of the driven pulley also being movable toward and away from the fixed face to thereby vary distance therebetween, the movable face of the driven pulley being moved in response to variation in the wrapping diameter of the belt.

25. The electrically operated saddle vehicle according to claim 24, wherein the twin-tube vehicle frame has two generally parallel portions and wherein the vehicle further comprises a reducing gear mechanism connected to the non-stage transmission, the reducing gear mechanism, the electric motor and the non-stage transmission being integrally formed as a power unit, the rotary shaft of the electric motor and an output shaft of the reducing gear mechanism being parallel to the two parallel portions of the vehicle frame, the power unit being located beneath the vehicle frame.

26. The electrically operated saddle vehicle according to claim 19, wherein the twin-tube vehicle frame has two generally parallel portions and wherein the electric motor has a rotary shaft, the vehicle further comprises a reducing gear mechanism with an output shaft, the reducing gear mechanism being connected to the non-stage transmission, the rotary shaft and output shaft being parallel to the two parallel portions of the vehicle frame, and the electric motor, the transmission means and the reducing gear mechanism being located beneath the vehicle frame.

* * * * *